United States Patent [19]
Koike

[11] Patent Number: 5,706,096
[45] Date of Patent: Jan. 6, 1998

[54] OPTIMUM LINE DENSITY DETERMINING METHOD AND SYSTEM

[75] Inventor: Kazumasa Koike, Atsugi, Japan

[73] Assignee: Ricoh Company, Ltd., Tokyo, Japan

[21] Appl. No.: 810,886

[22] Filed: Mar. 5, 1997

Related U.S. Application Data

[63] Continuation of Ser. No. 426,569, Apr. 21, 1995, abandoned.

[30] Foreign Application Priority Data

Apr. 25, 1994 [JP] Japan .................... 6-107409

[51] Int. Cl.⁶ .................... H04N 1/417; H04N 1/41
[52] U.S. Cl. .................... 358/261.2; 358/426
[58] Field of Search .................... 358/261.1–261.3, 358/426; 382/244–247

[56] References Cited

U.S. PATENT DOCUMENTS

| | | | |
|---|---|---|---|
| 5,335,290 | 8/1994 | Cullen et al. | 358/261.1 |
| 5,488,483 | 1/1996 | Murayama | 358/426 |

FOREIGN PATENT DOCUMENTS

| | | |
|---|---|---|
| 4-256284 | 9/1992 | Japan . |
| 4-287564 | 10/1992 | Japan . |
| 4-287565 | 10/1992 | Japan . |
| 4-287566 | 10/1992 | Japan . |

Primary Examiner—Edward L. Coles, Sr.
Assistant Examiner—Stephen Brinich
Attorney, Agent, or Firm—Oblon, Spivak, McClelland, Maier & Neustadt, P.C.

[57] ABSTRACT

A method and system for determining an optimal line density for further processing of an imaged document, in which contiguously located pixels of a predetermined color in an image document are counted and based thereon image fineness/coarseness and an optimal line density representing the document is determined. The imaged document is then converted to the optimal line density and provided for further processing, such as for transmission via facsimile.

15 Claims, 20 Drawing Sheets

OPTIMUM LINE DENSITY DETERMINING METHOD AND SYSTEM

This application is a Continuation of application Ser. No. 08/426,569, filed on Apr. 21, 1995, now abandoned.

BACKGROUND OF THE INVENTION

1. Field of the Invention

The present invention relates to an optimum line density determining method and system, used in an image processing apparatus, for determining an optimum line density at which two-tone image information is output. The determination is performed so that the thus-obtained optimum line density is appropriate to contents of the two-tone image information.

2. Description of Prior Art

In a well-known facsimile apparatus, when an image is transmitted, an operator can select any line density of predetermined line densities, the image being then scanned at the thus-selected line density. When the operator selects a high line density, it is possible to transmit a high-quality image in which even small letters can be easily read by an operator who receives the thus-transmitted image. However, in this case, a data amount of relevant image data is large and thus a long time is required to transmit the image. In contrast to this, if a low line density is selected by the operator who sends the image, a low quality of image will be sent and thus small letters cannot be easily read by the operator who receives the image. However, in this case, a short time is required to send the image.

Therefore, ordinarily, the operator is to manually select an optimum line density appropriate to contents of an image to be sent so that the operator selects a low line density when the image to be sent is an image of a document including large letters and selects a high line density when the image is an image of a document including small letters.

For example, in Japanese Laid-Open Patent Application No. 4-287564, an image processing apparatus is proposed. The thus-proposed apparatus scans an original image at a fixed high line density to obtain image information having the high line density; then determines an appearance frequency of thin-line patterns in the thus-read image; and then converts the image information having the high line density into image information having a low line density if the thus-determined appearance frequency is low.

According to the proposed apparatus, because an optimum line density is automatically selected depending on contents of the scanned image, the appearance frequency of thin-line patterns being determined from the contents, it is not necessary for an operator to manually select an optimum line density.

However, in the proposed apparatus, the determination of the appearance frequency of thin-line patterns is performed using a method as follows: for example, pixel blocks of 3 pixels (vertical direction) by 3 pixels (horizontal direction) are extracted one by one from a page of an input image in a form of image information; and the apparatus determines that a thin-line pattern is present if three black pixels in a row have been found in a thus-extracted pixel block. Such a method does not finely detect widths of black lines present in an input image.

In fact, a black line in an input image having a line width of two pixels cannot be detected in the above-described method which mainly detects a black line having a line width of a single pixel as a result of detecting three pixels in a row in an extracted pixel block. Thus, in this method, the black line having a line width of two pixels cannot be detected as a thin-line pattern, and therefore a resulting appearance frequency of thin-line patterns is low, even though such a two-pixel-line-width black line is included in the input image. As a result, a low line density may be automatically selected. The low line density may be, for example, very low in comparison with the high line density in which the image was read in, such as that of ¼ the high line density. When the line density of the image is quartered, 4 original pixels are represented by one large pixel. If the one large pixel thus obtained from the 4 original pixels is a black pixel and these 4 original pixels include only two black pixels as a width of the above-mentioned two-pixel line-width black line, the two-pixel line-width black line becomes a four-pixel line-width black line. Thus, the black line is thick in a thus-obtained output image in comparison with that in the input image. If the above-mentioned one large pixel thus obtained from the 4 original pixels is a white pixel, the two-pixel line-width black line in the input image disappears in the output image. Thus, an image quality is degraded.

Thus, in the method in the prior art, when an optimum line density is determined depending on particular contents of an input image, the thus-determined line density is not always one which finely depends on line widths of black lines included in the input image. Thus, an optimum line density finely depending on contents of an input image cannot be determined. As a result, the resolution of an input image may be automatically unexpectedly degraded even though the input image includes thin black lines having some line width, as described above.

SUMMARY OF THE INVENTION

An object of the present invention is to provide optimum line density determining method and apparatus by which an optimum line density finely depending on contents of an input image can be determined.

An image type determining method according the present invention comprises steps of:

a) counting a number of pixels included in each set of pixels which pixels are of a predetermined color and are continuously arranged, said pixels being ones included in input image information; and b) determining that said input image information is image information of a fine image, if, as a result of the counting in said step a), it has been found that there are relatively many sets of continuously arranged predetermined-color pixels, a number of pixels included in each set of said many sets of continuously arranged predetermined color pixels being small; and determining that said image information is image information of a coarse image, if, as a result of the counting in said step a), it has been found that there are relatively many sets of continuously arranged predetermined-color pixels, a number of pixels included in each set of said many sets of continuously arranged predetermined-color pixels being large.

Further, an optimum line density determining method according to the present invention comprises steps of:

a) counting a number of pixels included in each set of pixels which pixels are of a predetermined color and are continuously arranged, said pixels being ones included in input image information;

said input image information being image information consisting of lines of pixels, said lines being arranged in an original line density; and b) determining a high line density as an optimum line density if, as a result of the counting in said step a), it has been found that there are relatively many sets of continuously arranged predetermined-color pixels, a number of pixels included in each set of said many sets of continuously arranged predetermined-color pixels being small; and determining a low line density as said optimum line density if, as a result of the counting in said step a), it has been found that there are relatively many sets of continuously arranged predetermined-color pixels, a number of pixels included in each set of said many sets of continuously arranged predetermined-color pixels being large;

said optimum line density being a line density into which said original line density of said input image information is then converted.

Thereby, if image information of a relatively coarse image is processed, a line density thereof is effectively reduced before being processed. As a result, a hardware scale and/or software scale required for the processing can be automatically reduced.

Further, in the optimum line density determining method, said step a) may perform the counting operation on an area of a page of said inputted image information, which area is an area other than an area including a halftone image.

Thereby, if the input image information is image information of an image including a two-tone letter image and a halftone picture image, the optimum line density is determined so as to be an optimum line density appropriate for the two-tone letter image.

Other objects and further features of the present invention will become more apparent from the following detailed description when read in conjunction with the accompanying drawings.

DESCRIPTION OF THE PREFERRED EMBODIMENTS

With reference to accompanying drawings, embodiments of the present invention will now be described.

Figure 1:
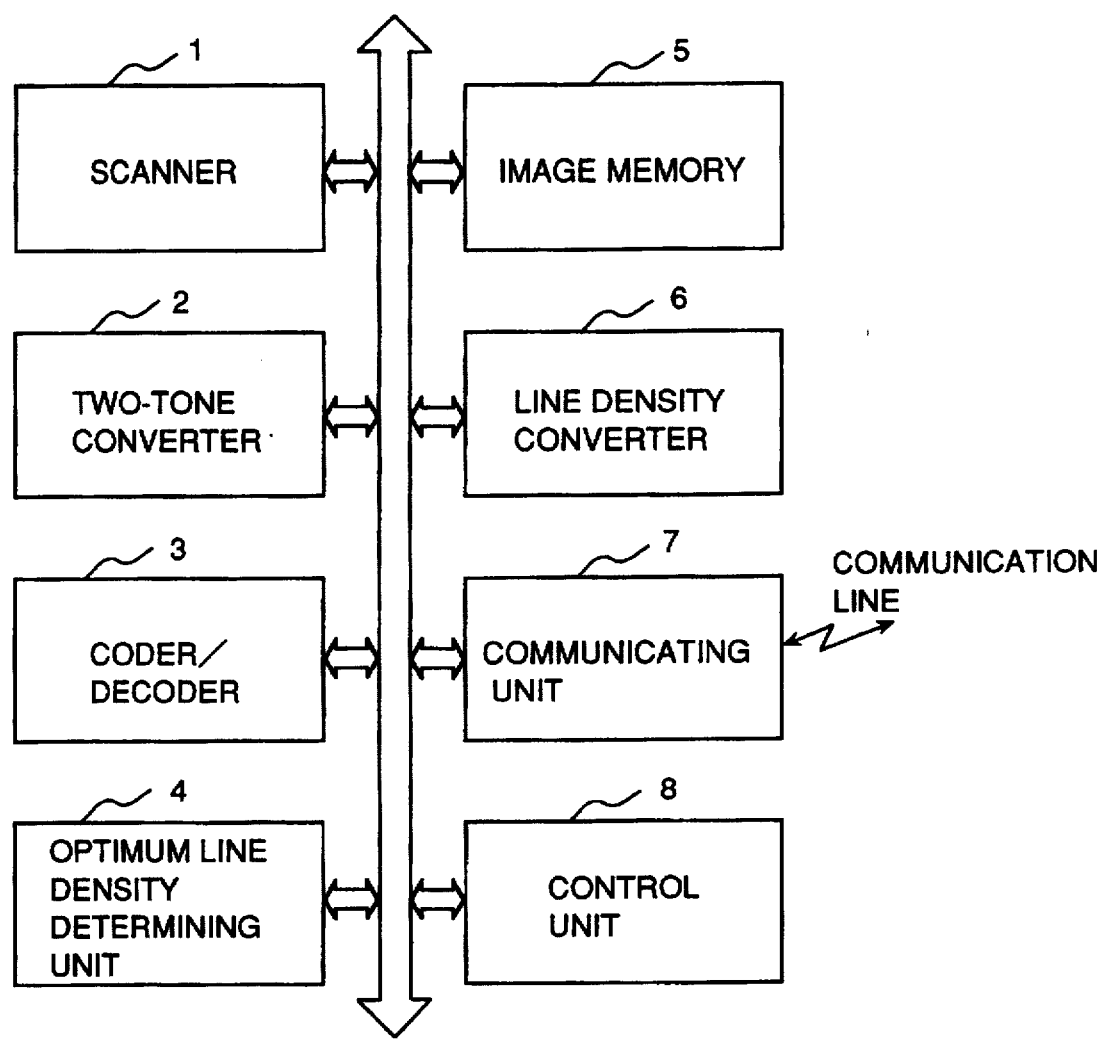
FIG. 1 shows a block diagram of a facsimile apparatus in a first embodiment of the present invention.

With reference to FIG. 1, a block structure of a facsimile apparatus in a first embodiment of the present invention will now be described. In the figure, a scanner 1 scans an original image at a fixed high line density and obtains image information representing the image. A two-tone converter 2 converts the image information into two-tone image data. A coder/decoder 3 compresses the two-tone image data so as to code it, and also the coder/decoder 3 decodes and thus restores once-coded image data into original two-tone image data. Image data coded by the coder/decoder 3 may be transmitted to another facsimile apparatus. Image data which has been received after being transmitted by another facsimile apparatus is decoded by the coder/decoder 3.

An optimum line density determining unit 4 determines an optimum line density for the image information to be transmitted. An image memory 5 stores the image information. A line density converter 6 converts the above-mentioned high line density of the image information into either ½ the line density or ¼ the line density if necessary.

A communicating unit 7 communicates the image information with another facsimile apparatus in accordance with a known G3-standard procedure via a telephone line. A control unit 8 is a microcomputer controlling each unit in the apparatus.

Other than the above-described items, a plotter for printing out the received image information after being decoded by the coder/decoder 3, an operation unit and a display unit are provided to the apparatus. However, these units are not shown in the figure.

The facsimile apparatus including the above-mentioned units has a function of transmitting the image information having a main scan direction line density of 8 lines/ millimeter and having a sub-scan direction line density of any one of three line densities, that is, a standard density (which is 3.85 lines/millimeter and will be referred to as "STD", hereinafter), a detail density (which is 7.7 lines/ millimeter and will be referred to as "DTL", hereinafter), and a semi-super fine density (which is 15.4 lines/ millimeter) will be referred to as "SSF", hereinafter).

Ordinarily, the term "main scan direction" is a direction corresponding to a width direction of a paper sheet on which is printed the image to be scanned by the scanner 1. The paper sheet has a rectangular shape having longer sides and shorter sides perpendicular to the longer sides. The above-mentioned width direction is a direction of a width of the paper sheet, which width corresponds to the above-mentioned shorter sides.

When an operator transmits an image, the operator provides a paper sheet, on which the image is printed, to the scanner 1. Then, the operator appropriately manipulates the operation unit. As a result, the facsimile apparatus performs a predetermined image data transmitting process on the image.

Figure 2:
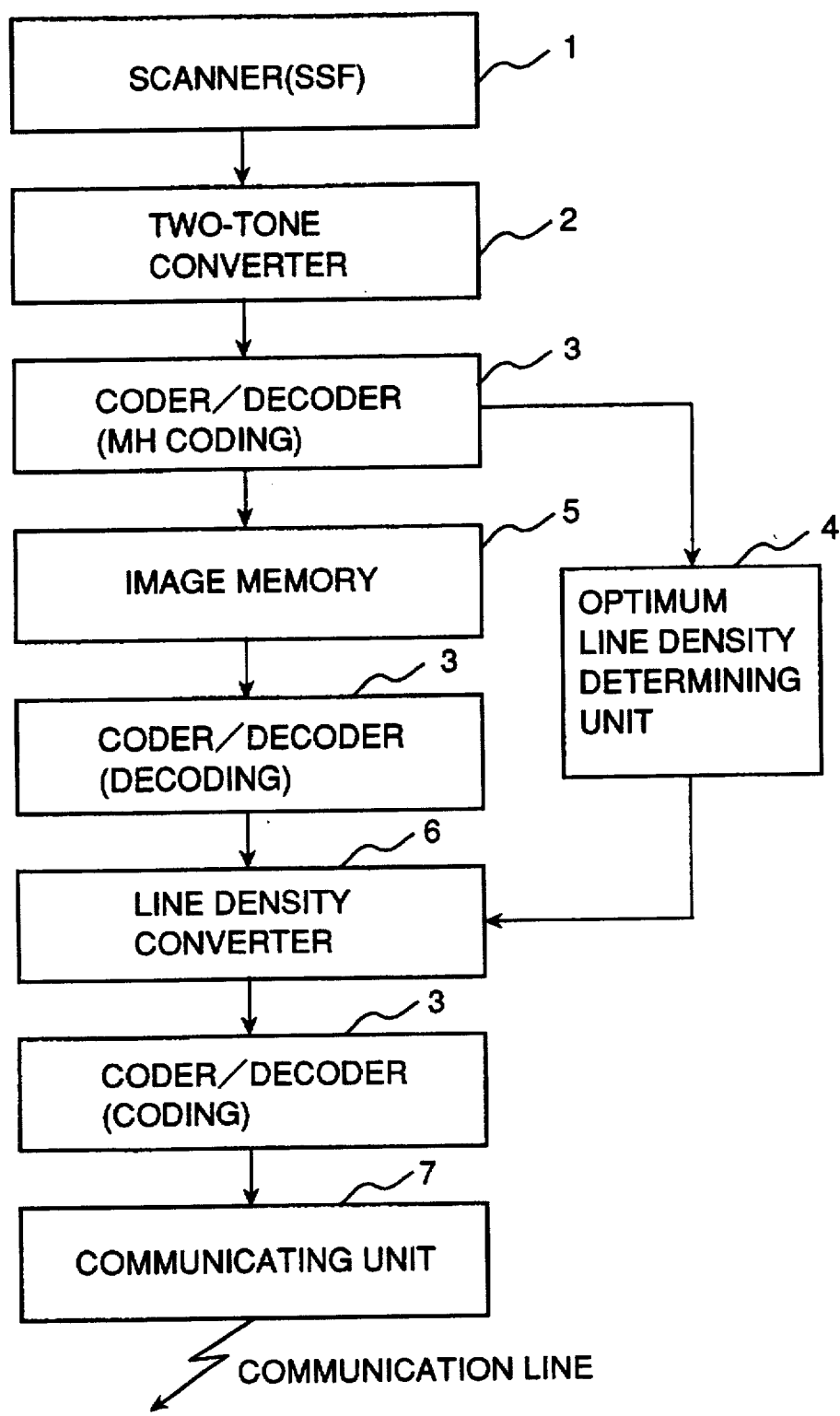
FIG. 2 shows an operation of the facsimile apparatus shown in FIG. 1 by showing how information flows when image information is transmitted.

With reference to FIG. 2, an information flow in this transmitting process will now be described. When the facsimile apparatus starts the transmitting process, it calls another remote facsimile apparatus. When the remote facsimile apparatus responds to this calling, the transmitting facsimile apparatus starts a scanning operation of the scanner 1. The scanner 1 then scans line by line (along the main scan direction) the image on the paper sheet provided to the scanner 1, and outputs a page of multiple-tone image information. In the present embodiment, this image scanning operation is always performed with a scanning resolution of the SSF which is the maximum line density of the above-mentioned three line densities. The two-tone converter 2 compares the page of multiple-tone image information with a fixed threshold value and thus simply converts the page of multiple-tone image information into a page of two-tone image information. The coder/decoder 3 codes the a page of two-tone image information in accordance with a well-known Modified Huffman method (which will be referred to as "MH method", hereinafter). The image memory 5 then stores the thus-coded page of two-tone image information.

In the coding in accordance with the MH method, a number of continuous black pixels (which will be referred to as a "run length", hereinafter) is measured for each line (read through the scanner 1 along the main scan direction) of the page of two-tone image information. Thus, the run lengths are measured along the main scan direction. Then, in accordance with the thus-measured run lengths, the page of two-tone image information is coded. The coder/decoder 3, during this coding process, each time a run length not larger than 3 (pixels) is measured, outputs run-length measurement information, which indicates the measurement, to the optimum line density determining unit 4.

Figure 3:
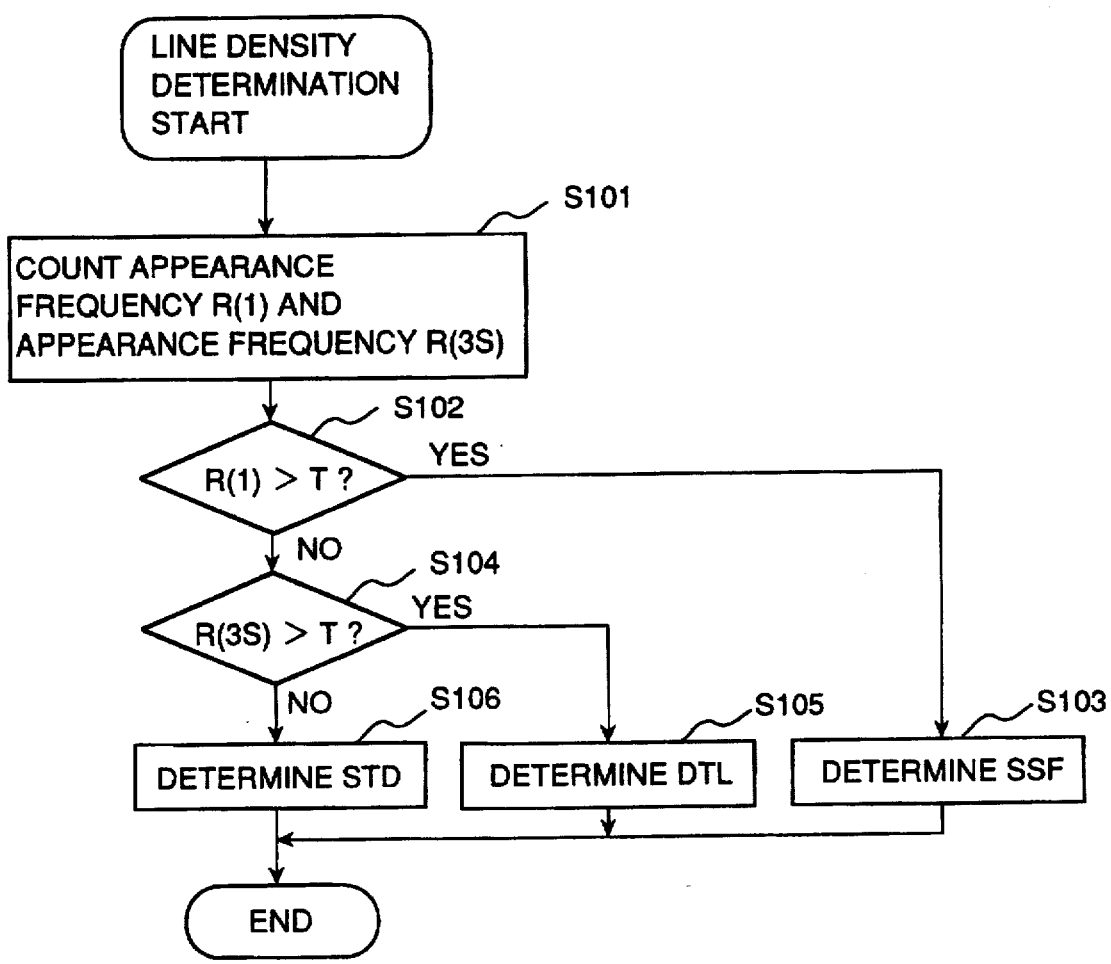
FIG. 3 shows an operation flowchart for determining an optimum line density in the facsimile apparatus shown in FIG. 1.

With reference to FIG. 3, an operating flow of an optimum line density determination process performed by the optimum line density determining unit 4 will now be described. In a step S101 (which word "step" will be omitted, hereinafter), during the coding operation being performed by the coder/decoder 3 on a page of the two-tone image information, an appearance frequency R(1) of the run length of 1 (pixel) (which will be referred to as an appearance frequency R(1), hereinafter) and an appearance frequency R(3S) of the run lengths not larger than 3 (pixels) (which will be referred to as an appearance frequency R(3S), hereinafter) are counted, respectively, using the above-mentioned run-length measurement information output by the coder/decoder 3.

When the coder/decoder 3 has performed the coding operation on the page of two-tone image information, the optimum line density determining unit 4 checks the appearance frequency R(1) counted on the page of two-tone image information in S102. If the appearance frequency R(1) of the page exceeds a predetermined value T (Yes in S102), the SSF is determined as the optimum line density to be used for the page in S103.

If the appearance frequency R(1) of the page does not exceed the predetermined value T (No in S102), the above-mentioned appearance frequency R(3S) is checked in S104. If the appearance frequency R(3S) exceeds the predetermined value T (Yes in S104), the DTL is determined as the optimum line density for the page (in S105).

If the appearance frequency R(3S) does not exceed the predetermined value T (No in S104), the STD is determined as the optimum line density for the page in S106.

The optimum line density determining unit 4 sends information indicating the thus-determined optimum line density to the line density converter 6. Then, the line density converter 6 converts the line density of the page of two-tone image information to the optimum line density indicated by the thus-sent information.

Once the thus-coded page of two-tone image information is stored in the image memory 5, the coder/decoder 3 then reads out the thus-stored page of two-tone image information from the image memory 5, and decodes it to the original one of the page of two-tone image information. The line density converter 6, if the DTL or the STD was determined as the optimum line density for the page of two-tone image information, converts the line density of the thus-decoded one of the page of two-tone image information to the thus-determined optimum line density. That is, because the original line density of the page of two-tone image information is the SSF when read in through the scanner 1, if the determined optimum line density is the DTL, the page of two-tone image information is converted into ½ the original line density thereof. If the determined optimum line density is the STD, the page of two-tone image information is converted into ¼ the original line density thereof. If the determined optimum line density is the SSF, the line density converter 6 allows the page of two-tone image information to pass therethrough without any line density conversion performed on the page of two-tone image information.

Then, the coder/decoder 3 again codes the page of two-tone image information output by the line density converter 6. The communicating unit 7 transmits the thus-coded page of two-tone image information to the remote facsimile apparatus.

Thus, in the first embodiment of the present invention, when the appearance frequency of the run length of 1 (pixel) is higher than the predetermined value T, the SSF is determined as the optimum line density which will be the line density of the two-tonen image information to be transmitted. The density SSF is the same as the line density of the multiple-tone image information when it is scanned by the scanner 1. If the image to be scanned by the scanner 1 includes many thin black lines having a line width of one pixel, a line width of one pixel corresponding to 0.125 (⅛) millimeter along the main scan direction, the appearance frequency of the run length of 1 is high accordingly. As a result, the SSF is determined as the optimum line density, and thus the two-tone image information with the SSF (highest line density), appropriate to the contents of the image, that is, appropriate to the presence of many thin black lines in the image, is transmitted.

Further, there may be a case where if the image to be read in by the scanner 1 includes, for example, many thin black lines having a line width of 2 pixels and/or equivalent minute image parts. In such a case, an appearance frequency of run lengths of 2 (pixels) is high accordingly. As a result, the appearance frequency R(1) of run lengths of 1 may not be higher than the predetermined value T and also the appearance frequency R(3S) of run lengths not larger than 3 may be higher than the predetermined value. In such a case, the DTL is determined as the optimum line density. As a result, two original pixels are converted into one large one pixel during line density conversion in the line density converter 6. However, the resulting image includes many black lines having the line width of 2 pixels and/or equivalent minute image parts as mentioned above. These lines and/or image parts do not disappear during this line density conversion through the line density converter 6. Thus, a problematic situation can be prevented, in which situation some black lines and/or equivalent minute image parts included in the original image either disappear or are enlarged. Further, as a result of lowering the line density from the highest SSF to the middle DTL, a data amount of the two-tone image information to be transmitted can be reduced.

The line width of two pixels corresponds to 0.25 millimeter along the main scan direction. Generally speaking, in printed letters in ordinary documents, a line width of a letter having general outline dimensions of 4 millimeters by 4 millimeters is, for example, 0.25 millimeter.

There may be a case where the image to be read in by the scanner 1 does not include many thin black lines having line widths not larger than 3 pixels or equivalent image parts, and instead includes many lines having black line widths larger than 3 pixels or equivalent image parts. In such a case, the appearance frequency of run lengths not larger than 3 pixels may not be higher than the predetermined value T. As a result, the STD is determined as the optimum line density, and thus the line density of the two-tone image information is ¼ the original line density thereof. However, the image includes many black lines having the line widths larger than 3 pixels and/or equivalent image parts. These lines and/or image parts do not disappear during this line density conversion through the line density converter 6. Thus, a problematic situation can be prevented, in which situation some black lines and/or equivalent minute image parts included in the original image either disappear or are enlarged. Further, as a result of lowering the line density from the highest SSF to the lowest STD, a data amount of the lowest image information to be transmitted can be further reduced.

In the first embodiment of the present invention, the optimum line density is determined according to the contents of the image, that is, according to a matter as to which width or thickness of each of many black lines and/or equivalent image parts is included in the image. Specifically, if the image includes many thin lines or equivalent minute image parts, that is, the image is a fine image, a high line density is determined as the optimum line density and thus original fineness of the fine image can be maintained during the line density conversion. Thus, image quality degradation can be prevented. If the image includes many thick lines or equivalent image parts, that is, the image is a coarse image, a low line density is determined as the optimum line density and thus a data amount of the two-tone image information to be transmitted can be effectively reduced without substantially degrading the image quality.

Further, in the first embodiment of the present invention, the determination of the optimum line density is performed using the appearance frequencies of run lengths measured along the main scan direction. Ordinarily, the image printed on the paper sheet is scanned by the scanner 1 line by line each line extending along the main scan direction. The measuring of a run length along the main scan direction may be performed on each line immediately after the line has been scanned by the scanner 1. Therefore, provision of a plurality of line buffers for storing a plurality of lines at the same time is not necessary for the run length measuring purpose. Thus, the optimum line density determination can be performed through a relatively simple structure.

Further, the coder/decoder 3 in the first embodiment of the present invention uses the MH method as mentioned above for coding image information, the MH method necessarily including the measuring run lengths along the main scan direction. The measuring run lengths along the main scan direction included in functions of the coder/decoder 3 are used for determining the optimum line density. Therefore, it is not necessary to further provide means for measuring run lengths along the main scan line particularly for the optimum line density determining operation. Thus, the optimum line density determination can be performed through a relatively simple structure.

A facsimile apparatus in a second embodiment of the present invention will now be described.

The facsimile apparatus in the second embodiment has a structure the same as that of the facsimile apparatus in the first embodiment, except for a structure concerning a difference in the optimum line density determining operation. Operations of the facsimile apparatus in the second embodiment are the same as those of the facsimile apparatus in the first embodiment, except for the difference in the optimum line density determining operation.

Figure 4:
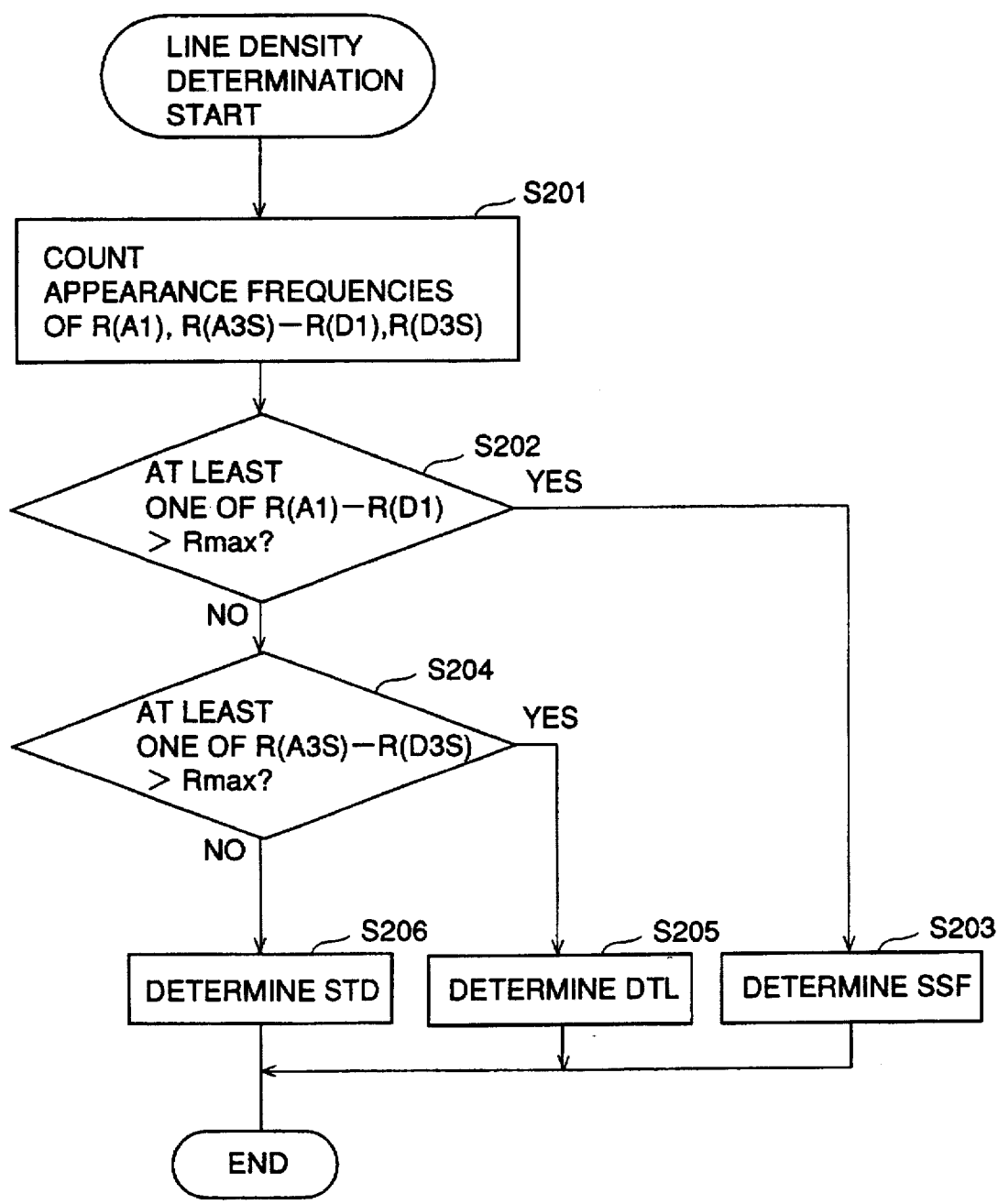
FIG. 4 shows an operation flowchart for determining an optimum line density in a facsimile apparatus in a second embodiment of the present invention.

With reference to FIG. 4, the optimum line density determining operation in the facsimile apparatus in the second embodiment will now be described. Similar to the operation in the facsimile apparatus in the first embodiment, the optimum line density determining operation in the facsimile apparatus in the second embodiment includes measuring run lengths along the main scan direction using run-length measurement information output by the coder/decoder 3, and thus counts appearance frequencies of run lengths. However, in the second embodiment, an image area of a page of two-tone image information is divided into a plurality of blocks, and the appearance frequency counting is performed on each one of the plurality of blocks.

Figure 5:
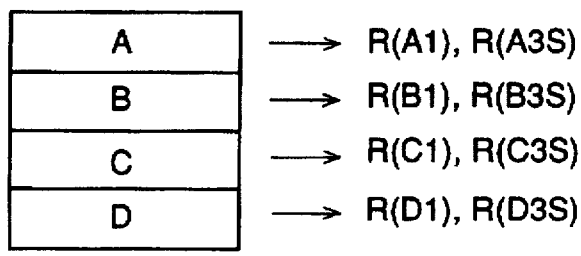
FIG. 5 illustrates dividing of a scanned image into a plurality of blocks in the facsimile apparatus shown in FIG. 4.

As shown in FIG. 5, for example, the page is divided into 4 blocks A, B, C and D. In this case, on the block A, an appearance frequency R(A1) of run lengths of 1 (pixel) (which will be referred to as an appearance frequency R(A1), hereinafter) and an appearance frequency of R(A3S) of run lengths not larger than 3 (pixels) (which will be referred to as an appearance frequency R(A3S), hereinafter) are counted, respectively, in S201. Similarly, on each of the remaining three blocks B-D, a respective one of appearance frequencies R(B1), R(C1) and R(D1) of run lengths of 1 (pixel) (which will be referred to as appearance frequencies R(B1), R(C1) and R(D1) hereinafter) and a respective one of appearance frequencies of R(B3S), R(C3S) and R(D3S) of run lengths not larger than 3 (pixels) (which will be referred to as appearance frequencies R(B3S), R(C3S) and R(D3S) hereinafter) are counted, respectively, also in S201.

After these counting operations are thus performed on the page of two-tone image information, the thus-obtained 4 appearance frequencies R(A1), R(B1), R(C1), and R(D1) respectively counted on the blocks A, B, C and D of the page of two-tone image information in S202 are checked. If the 4 appearance frequencies R(A1)-R(D1) include at least one which exceeds a predetermined value Rmax (Yes in S202), the SSF is determined as the optimum line density to be used for the page in S203.

If every one of the 4 appearance frequencies R(A1)-R(D1) does not exceed the predetermined value Rmax (No in S202), the above-mentioned 4 appearance frequencies R(A3S), R(B3S), R(C3S) and R(D3S) are checked in S204. If the 4 appearance frequencies R(A3S)-R(D3S) includes at least one which exceeds the predetermined value Rmax (Yes in S204), the DTL is determined as the optimum line density for the page (in S205).

If every one of the 4 appearance frequencies R(A3S)-R(D3S) does not exceed the predetermined value Rmax (No in S204), the STD is determined as the optimum line density for the page in S206.

Thus, in the second embodiment of the present invention, if the four blocks of the page includes one in which an appearance frequency of short run lengths is high, a high line density is determined as the optimum line density. Therefore, even if only a part of the page includes minute image parts, the presence of the minute image parts may be effectively evaluated, and thus the high line density is determined as the optimum line density. As a result, image qualities of the minute image parts are prevented from being degraded when the relevant image information is transmitted.

Figure 6:
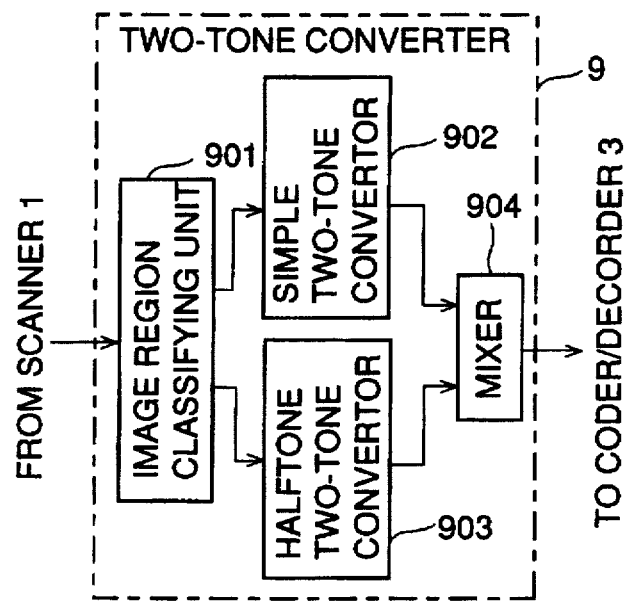
FIG. 6 shows a block diagram of a two-tone converter used in a facsimile apparatus in a third embodiment of the present invention.

With reference to FIG. 6, a facsimile apparatus in a third embodiment of the present invention will now be described.

A structure of the facsimile apparatus in the third embodiment is the same as the structure of the facsimile apparatus in the first embodiment, except for a difference between the two-tone converters. The facsimile apparatus in the third embodiment uses the two-tone converter 9 instead of the two-tone converter 2 shown in FIG. 1. In FIG. 6, an image region classifying unit 901 classifies an area of the page of input image information into a letter region and a halftone region. A simple two-tone converter 902 is the same as the two-tone converter 2 and simply converts the thus-classified letter region of image information into two-tone image information. A halftone two-tone converter 903 performs a halftone converting process such as the well-known dithering method or error dispersion method on the thus classified halftone region and thus converts it into two-tone image information. A mixer 904 mixes the thus-converted two-tone image information of the letter region with the two-tone image information of the halftone region and thus obtains the page of two-tone image information.

The facsimile apparatus in the third embodiment may transmit a page of two-tone image information which represents both letter image parts and halftone image parts such as those of pictures, the letter image parts being mixed with the halftone image parts in a page.

For this purpose, the facsimile apparatus performs the image information transmission process in the procedure shown also in FIG. 2. However, in the third embodiment, the two-tone converter 9 converts the multiple-tone one of the page of input image information to the two-tone one thereof as described above with reference to FIG. 6. Further, the optimum line density determining unit 4 uses lines, in the main scan direction, of the image, which lines do not include lines including the halftone region. In an example shown in FIG. 7, only lines of an area indicated by hatching are used to obtain the above-mentioned appearance frequency R(1) and the appearance frequency R(3S).

Then, the thus-obtained appearance frequencies R(1) and R(3S) are used to determine a line density as the optimum line density in accordance with a procedure which was described above with reference to FIG. 3, S102, S103, S104, S105, and S106.

There may be a case where the image to be scanned by the scanner 1 includes a letter image part having relatively thick black lines therein and a halftone image part. In this case, when the appearance frequencies of run lengths are counted using lines which include the halftone image part, an appearance frequency of short run lengths is high. Therefore, the result of the counting using these lines is included in the final appearance frequencies to be used to determine a line density as the optimum line density, and therefore, a high line density is determined as the optimum line density, although it is not necessary to use such a high line density for the letter image part having relatively thick black lines which is also included in the image as mentioned above.

If it is not required to maintain a high image quality of the halftone image part when the image including the halftone image part is transmitted, the above-described method in the third embodiment is effective. In the method, only lines in the page of image information not including the halftone image part are used to count the appearance frequencies of run lengths. These appearance frequencies of run lengths are then used for determining a line density as the optimum line density at which the page of image information is transmitted. As a result, the thus-determined optimum line density is appropriate only to the contents of the letter image part, that is, line widths or thicknesses of black lines constituting letters of the letter image part. Therefore, a data amount of the image information to be transmitted can be effectively reduced without substantially degrading the image quality of the letter image part.

A facsimile apparatus in a fourth embodiment of the present invention will now be described.

The apparatus in the fourth embodiment has a structure almost the same as the structure of the apparatus of the third embodiment, and the apparatus in the fourth embodiment performs operations in a procedure almost the same as the procedure in which the apparatus in the third embodiment performs operations. However, in the fourth embodiment, the optimum line density determining unit 4 divides a page of image information read by the scanner 1 into 4 blocks A, B, C and D shown in FIG. 8. The dividing is performed so that, as shown in the figure, only an area consisting of lines, extending along the main scan direction, which lines do not include lines including a halftone region, is used.

Then, as described above for the apparatus in the second embodiment, the 4 appearance frequencies R(A1)-R(D1) and the 4 appearance frequencies R(A3S)-R(D3S) are counted. Using the thus-counted appearance frequencies, in the procedure described with reference to FIG. 4, a line density is determined as the optimum line density.

Figure 8:
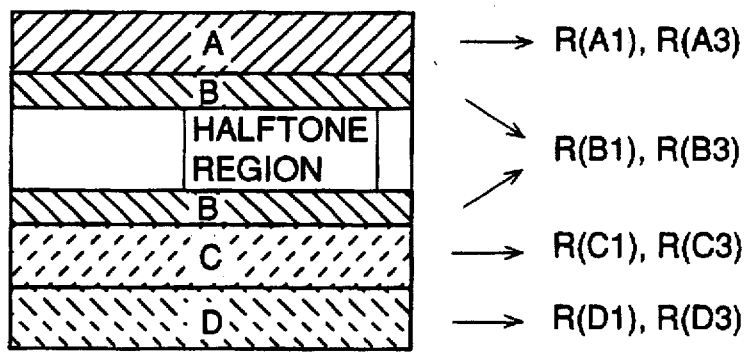
FIG. 8 shows areas in a scanned image, on which areas appearance frequencies of run lengths are counted in a facsimile apparatus in a fourth embodiment of the present invention.

There may be a case where, as shown in FIG. 8, a page of image information scanned by the scanner 1 consists of a letter region except for the halftone region shown in the figure. Further, a minute image part having a small area in the page is included in one of the 4 blocks A–D shown in the figure. The minute image part is an image part which consists of, for example, a fine image and thus a high line density is required as the optimum line density. Even in such a case, by dividing a part of the page into the 4 blocks, it is possible to make such a minute image part of a small area be surely recognized. As a result, a high line density may be determined as the optimum line density and thus it may be possible to maintain a high quality of the minute image part when it is transmitted.

Figure 7:
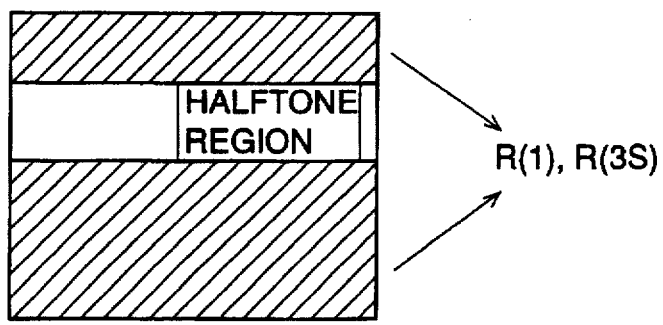
FIG. 7 shows areas in a scanned image, in which areas appearance frequencies of run lengths are counted in the facsimile apparatus shown in FIG. 6.

In each of the above-described third and fourth embodiments, there may be a case where the halftone region is long along a sub-scan direction perpendicular to the main scan direction, which sub-scan direction is the vertical direction in each of FIGS. 7 and 8. In such a case, a page of image information includes many lines which include the halftone region and thus only few lines other than the lines including the halftone region remain in the page. In such a case, only few lines are used to count the appearance frequencies of run lengths and thus the above-mentioned predetermined value Rmax may be changed accordingly. Specifically, the predetermined value Rmax may be reduced as a number of lines used for counting the appearance frequencies is reduced due to the long halftone region. Further, in a case where the lines including the halftone region are few and thus the lines to be used for counting the appearance frequencies are many in the page of image information, the predetermined value Rmax may be enlarged accordingly. Thus, it is possible to prevent an evaluation criterion of the appearance frequencies from being substantially varied due to a variation of length of the halftone region.

A facsimile apparatus in a fifth embodiment of the present invention will now be described.

The apparatus in the fifth embodiment has the structure shown in FIG. 1 and operates by a procedure similar to the procedure shown in FIG. 2.

However, the coder/decoder 3 uses the well-known Modified Relative Element Address Designate method (which will be referred to as "MR method", hereinafter) instead of the MH method for coding image information.

Figure 9:
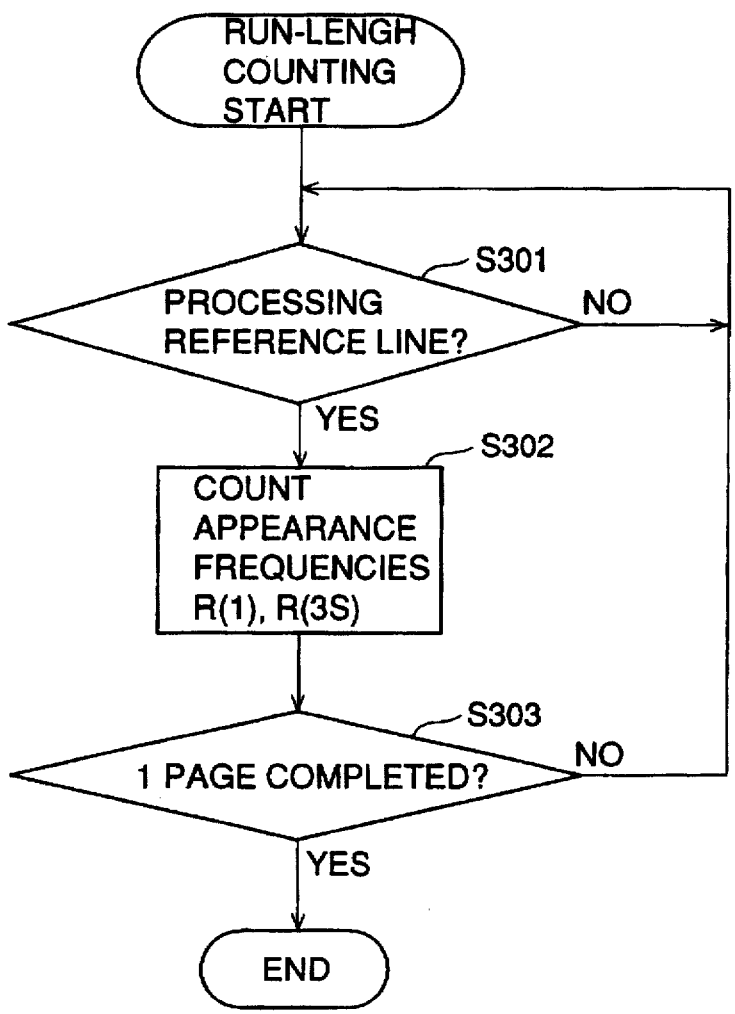
FIG. 9 shows an operation flowchart for counting the appearance frequencies of run lengths in a facsimile apparatus in a fifth embodiment of the present invention.

Further, the optimum line density determining unit 4 counts the appearance frequencies of run lengths in a procedure shown in FIG. 9. That is, in S301, after a coding operation of the page of image information is started by the coder/decoder 3, the optimum line density determining unit 4 identifies each line, which line extends along the main scan line, of a page of image information when the line is processed.

In the MR method, a reference line is determined from among lines of the page of image information. Then, a coding operation corresponding to that of the MH method is performed on the reference line. Then, on a number of lines subsequent to the reference line, another coding operation is performed. That is, each line of the subsequent lines is coded in accordance with a matter as to how the line differs from the reference line. One line, for example, every 2 lines or every 4 lines, is determined as the reference line. Thus, the two kinds of coding operations are repeatedly performed on the page of image information so that all the lines of the page are coded. The lines other than the reference lines are referred to as coding lines.

In the fifth embodiment, when the line which is currently processed by the coder/decoder 3 is the reference line (Yes in S301), the optimum line density determining unit 4 inputs run-length measurement information output by the coder/decoder 3. Using the thus-input information, the appearance frequencies R(1) and R(3S) are counted in S302.

This operation is repeatedly performed on the page of image information so that all the lines of the page are checked in S303, S301 and S302. After the page of image information is thus checked (Yes in S303), the counting operation is finished.

Then, using the thus-counted appearance frequencies R(1) and R(3S), a line density is determined as the optimum line density in the procedure shown in FIG. 3, S102, S103, S104, S105, and S106.

Thus, in the fifth embodiment, run-length measurement information necessarily generated when reference lines are processed in the MR method performed by the coder/decoder 4 is used for counting the appearance frequencies R(1) and R(3S) which is then used to determine a line density as the optimum line density. Thus, it is possible to effectively simplify a hardware scale and/or a software scale required for counting the above-mentioned appearance frequencies.

A facsimile apparatus in a sixth embodiment of the present invention will now be described.

Figure 10:
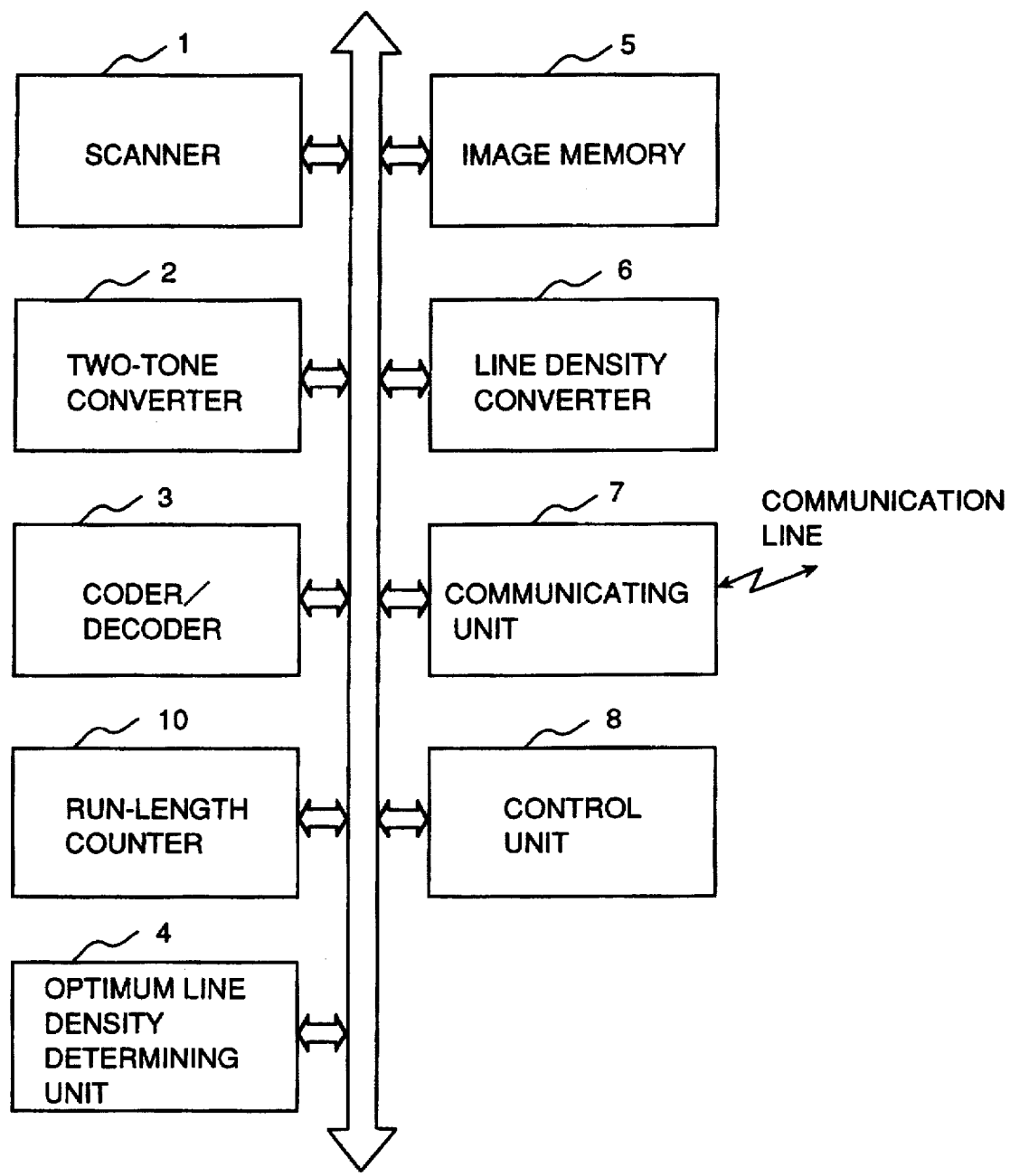
FIG. 10 shows a block diagram of a facsimile apparatus in a sixth embodiment of the present invention.

With reference to FIG. 10, the facsimile apparatus in the sixth embodiment has a structure resulting from adding a run-length counter 10 to the structure shown in FIG. 1.

Figure 11:
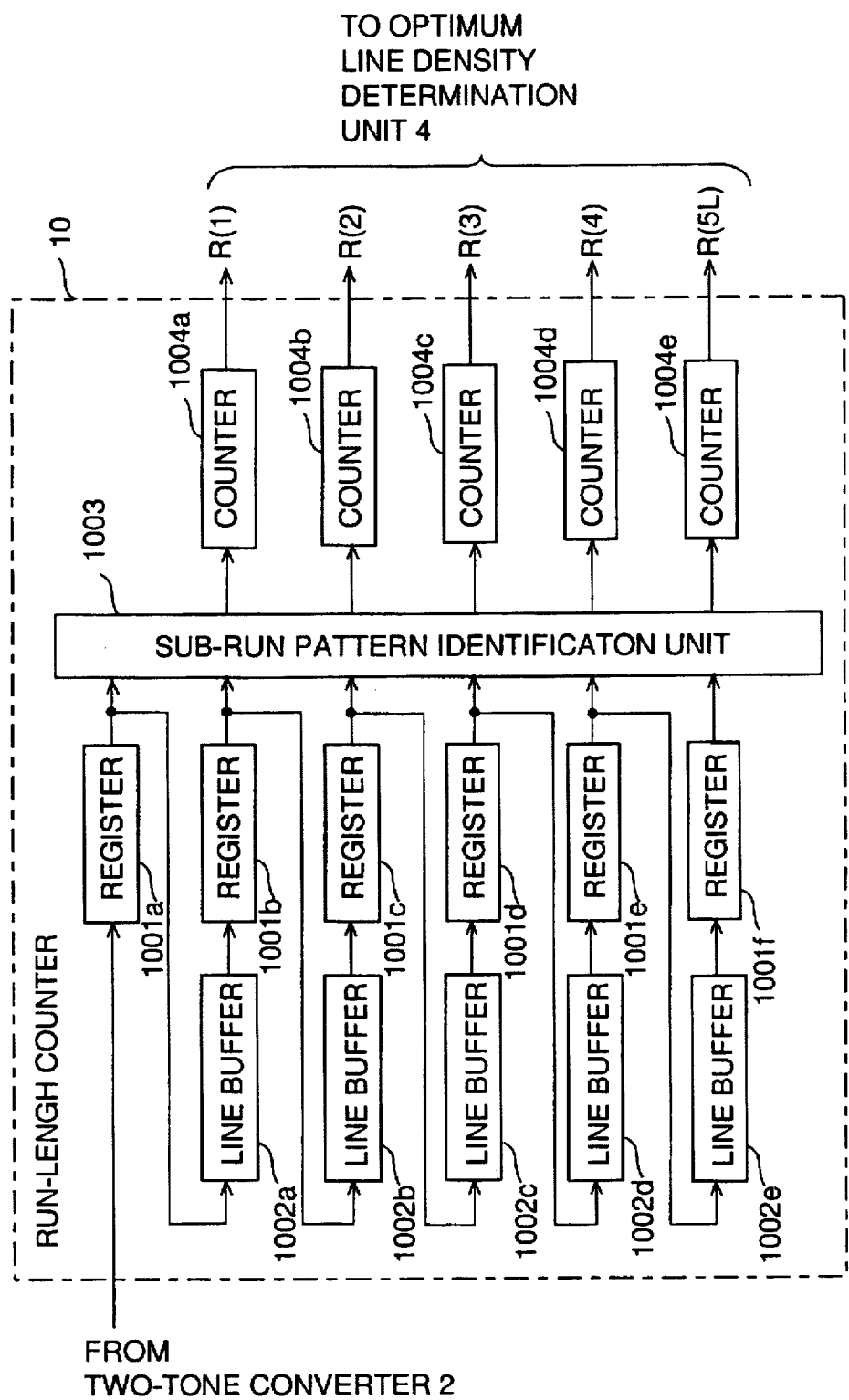
FIG. 11 shows a block diagram of a run-length counter used in the facsimile apparatus shown in FIG. 10.

With reference to FIG. 11, a structure of the run-length counter will now be described. Each of six registers 1001a through 1001f temporarily stores one pixel of the image information. Each of five line buffers 1002a through 1002e temporarily stores one line of the image information. However, actually, each line buffer of the line buffers 1002a through 1002e stores a number of pixels, which number is less, by one pixel, than a number of pixels constituting a line of image information. Thus, a pair of each register of the registers 1001a through 1001e and a respective one of the line buffers 1002a through 1002e store the number of pixels constituting a line of the image information.

A sub-run pattern identifying unit 1003 identifies a pattern of a row of pixels (which pattern will be referred to as a "run pattern", hereinafter) arranged along the sub-scan direction. Each of five counters 1004a through 1004e counts an appearance frequency of a respective one of various kinds of run patterns.

Figure 12:
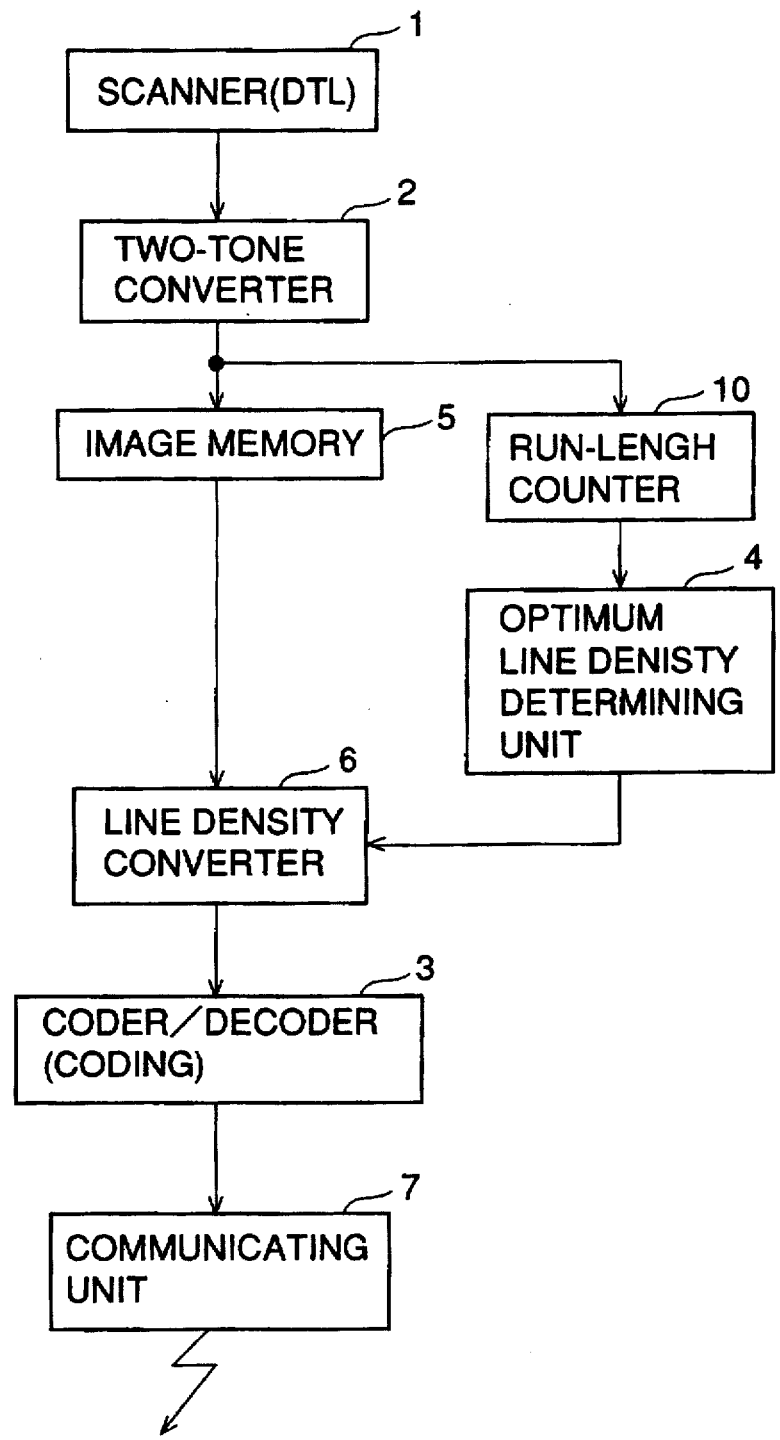
FIG. 12 shows an operation of the facsimile apparatus shown in FIG. 11 by showing how information flows when image information is transmitted.

FIG. 12 shows a information flow in the facsimile apparatus in the sixth embodiment when an image information transmission process is performed. When the scanner starts scanning an original image, it scans it at the line density DTL. Then, the two-tone converter 2 converts the thus-scanned image information into two-tone image information. The thus-converted image information is input to the image memory 5 and the run-length counter 10. The image memory temporarily stores the thus-input image memory.

The run-length counter 10 counts an appearance frequency of each one of various run lengths along the sub-scan direction. Specifically, the image information is input to the run-length counter 10 line by line (extending along the main scan direction), as each line of the image information is input to the run-length counter 10 pixel by pixel. Each line of image information thus input passes through the register 1001a, line buffer 1002a, register 1001b, line buffer 1002b, register 1001c, line buffer 1002c, register 1001d, line buffer 1002d, register 1001e, line buffer 1002e, and register 1001f, in this sequence, pixel by pixel.

As a result, pixels stored the six registers 1001a through 1001f indicate a column of 6 pixels along the sub-scan direction, which column of 6 pixels is one included in an image represented by the image information. Further, while all the lines of the image information are sequentially passing through the six registers 1001a through 1001f and five line buffers 1002a through 1002e, a column of 6 pixels stored in the six registers 1001a through 1001f at any given moment is one column of 6 pixels of all possible columns of pixels included in the image.

The sub-run pattern identifying unit 1003 reads in a run pattern of a column of 6 pixels stored in the six registers 1001a through 1001f at each given moment. Then, the unit 1003 determines whether or not the thus-read-in run pattern corresponds to one of predetermined run patterns.

With reference to FIGS. 13A through 13E, The above-mentioned predetermined run patterns will now be described. In each figure of the figures, a vertical column of 6 squares correspond to 6 pixels of image information stored in the six registers 1001a through 1001f, respectively. In the figures, each of blank squares represents a white pixel, each of hatched squares represents a black pixel, and each of X-marked squares represents a pixel which may be either a black pixel or a white pixel.

Figure 13:
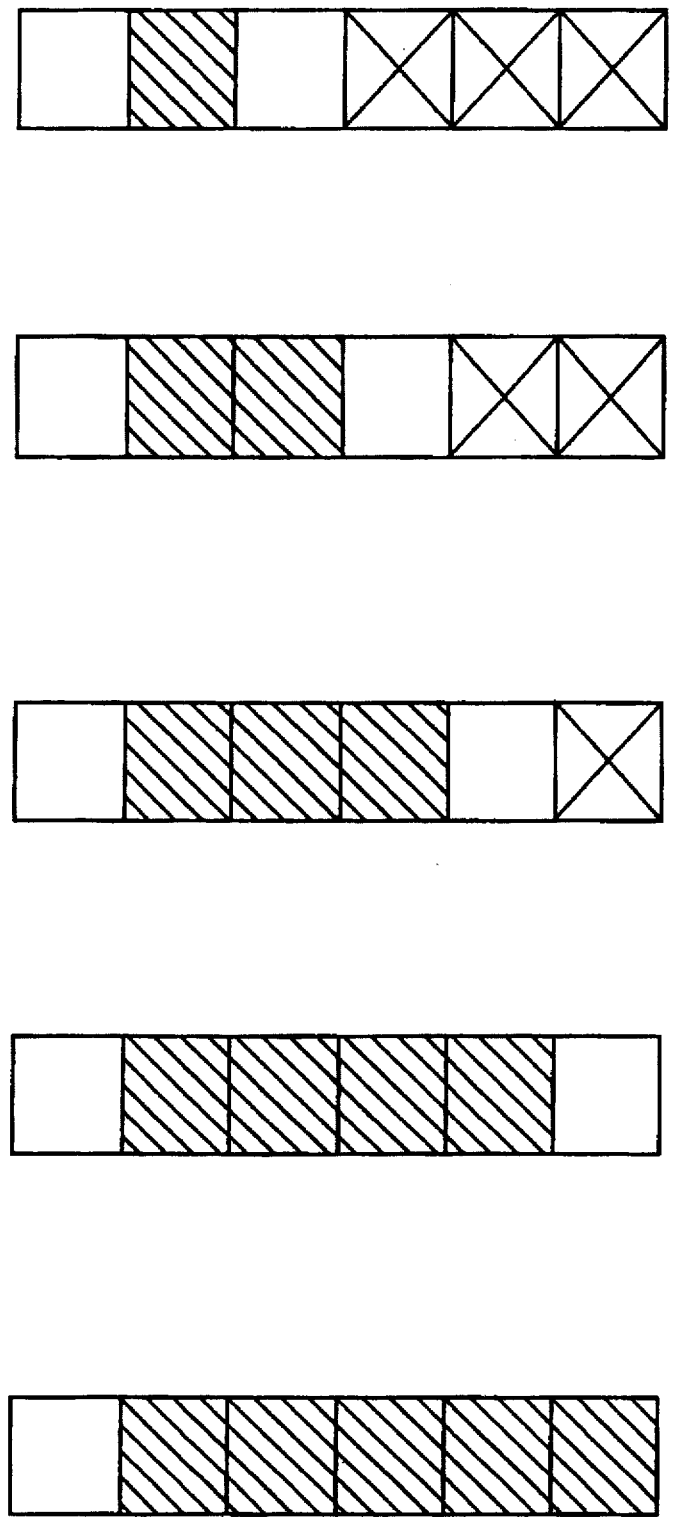
FIGS. 13A, 13B, 13C, 13D, and 13E show run patterns identified by a sub-run pattern identifying unit used in the facsimile apparatus shown in FIG. 11.

FIG. 13A shows a run pattern corresponding to a run lengths of numbers of pixels not less than five pixels along the sub-scan direction; FIG. 13B shows a run pattern corresponding to a run length of 4 pixels along the sub-scan direction; FIG. 13C shows a run pattern corresponding to a run length of 3 pixels along the sub-scan direction; FIG. 13D shows a run pattern corresponding to a run length of 2 pixels along the sub-scan direction; and FIG. 13E shows a run pattern corresponding to a run length of 1 pixel along the sub-scan direction.

An appearance frequency R(1) is an appearance frequency of run lengths of one pixel corresponding to the run pattern shown in FIG. 13E. That is, the appearance frequency R(1) is an appearance frequency obtained as a result of counting run lengths, each run length thereof consisting of one pixel. An appearance frequency R(2) is an appearance frequency of run lengths of two pixels corresponding to the run pattern shown in FIG. 13D. That is, the appearance frequency R(2) is an appearance frequency obtained as a result of counting run lengths, each run length thereof consisting of two pixels. An appearance frequency R(3) is an appearance frequency of run lengths of three pixels corresponding to the run pattern shown in FIG. 13C. That is, the appearance frequency R(3) is an appearance frequency obtained as a result of counting run lengths, each run length thereof consisting of three pixels. An appearance frequency R(4) is an appearance frequency of run lengths of four pixels corresponding to the run pattern shown in FIG. 13B. That is, the appearance frequency R(4) is an appearance frequency obtained as a result of counting run lengths, each run length thereof consisting of four pixels. An appearance frequency R(5L) is an appearance frequency of run lengths of numbers of pixels not less than five pixels corresponding to the run pattern shown in FIG. 13A. That is, the appearance frequency R(5L) is an appearance frequency obtained as a result of counting run lengths, each run length thereof consisting of a number of pixels not less than five pixels. The five counters 1004a through 1004e count these five appearance frequencies R(1) through R(5L), respectively.

While the image information is passing through the 6 registers and 5 line buffers as described above, each time the image information is shifted there by one pixel, the sub-run pattern identifying unit 1003 determines whether or not a column of 6 pixels of the image information currently stored in the 6 registers 1001a through 1001f corresponds to one of the 5 run patters shown in FIG. 13A through FIG. 13E. If it is determined that this row of 6 pixels corresponds to one of the five run patterns, the sub-run pattern identifying unit 1003 increments by one a relevant one of the five counters 1004a through 1004e. Thus, each of the five counters 1004a through 1004e counts a respective one of five appearance frequencies R(1), R(2), R(3), R(4) and R(5L).

Thus, the run-length counter 10 obtains the five appearance frequencies R(1), R(2), R(3), R(4) and R(5L) in the counters 1004a through 1004e on a page of the image information as a result of performing the above-described operations on the page of image information.

Then, the optimum line density determining unit 4 uses the thus-obtained five appearance frequencies R(1), R(2), R(3), R(4) and R(5L) for determining an optimum line density.

Figure 14:
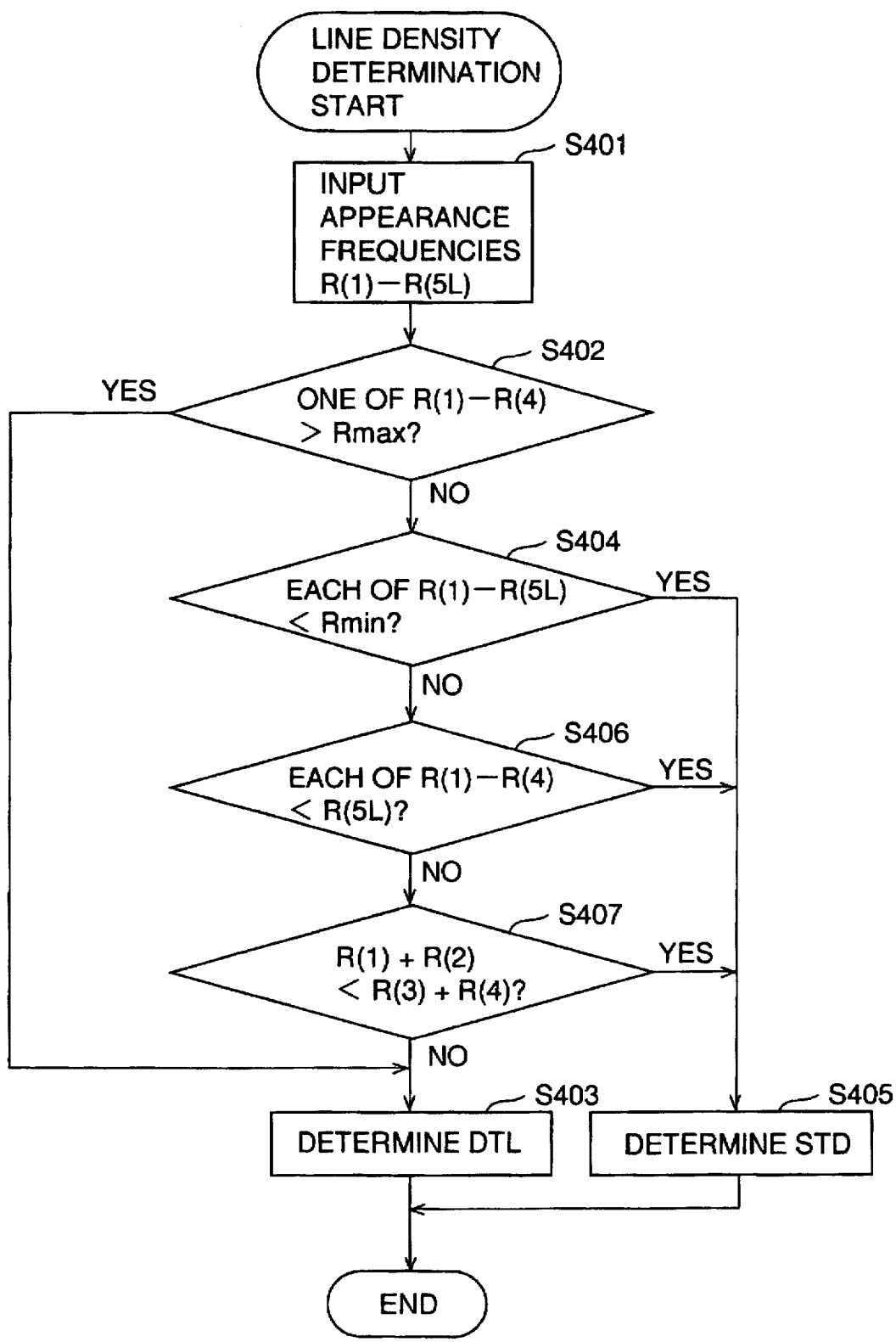
FIG. 14 shows an operation flowchart for determining an optimum line density in the facsimile apparatus shown in FIG. 10.

With reference to FIG. 14, an operation flow of the optimum line density determination performed by the optimum line density determining unit 4 will now be described. In S401, the above-mentioned appearance frequencies R(1), R(2), R(3), R(4) and R(5L) are input. Then, in S402, it is determined whether or not the appearance frequencies R(1), R(2), R(3) and R(4) includes one appearance frequency larger than a predetermined value Rmax.

Figure 15:
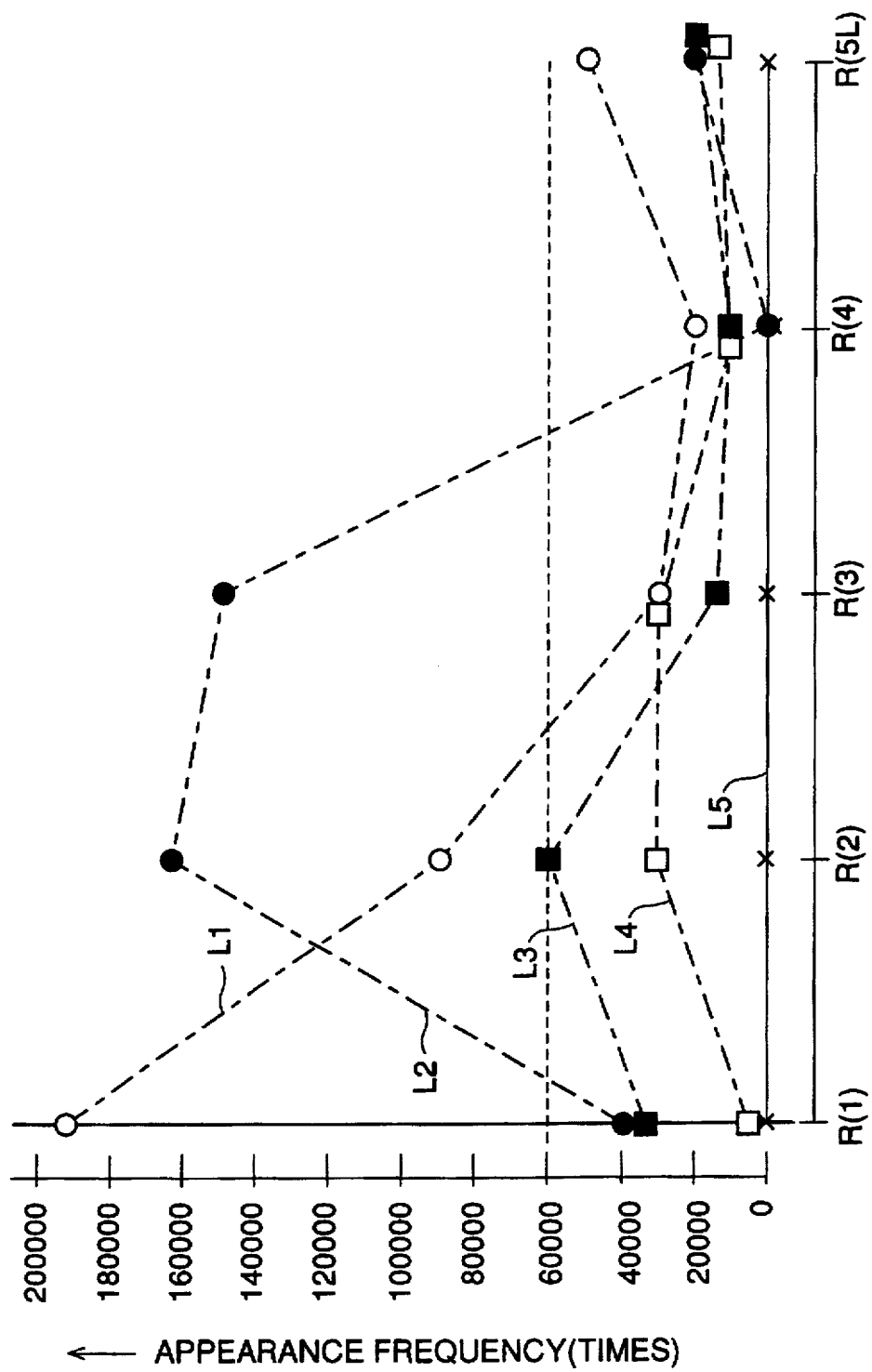
FIG. 15 shows an actually measured result of the appearance frequencies of run lengths measured on various types of original images.

FIG. 15 shows a result of actually measuring those appearance frequencies R(1), R(2), R(3), R(4) and R(5L) on five kinds of images, each image being printed on a respective A-4 size paper sheet. In the figure, a folded line L1 shows the appearance frequencies measured on image information resulting from converting a picture image (halftone image) into two-tone image information through the error dispersion method. A folded line L2 shows the appearance frequencies measured on image information resulting from converting the same picture image (halftone image) into two-tone image information through the dithering method. A folded line L3 shows the appearance frequencies measured on image information resulting from simply converting an image consisting of small letters, into two-tone image information. A folded line L4 shows the appearance frequencies measured on image information resulting from simply converting an image consisting of relatively large letters into two-tone image information. A folded line L5 shows the appearance frequencies measured on image information resulting from simply converting an image consisting of very large letters into two-tone image information.

After examining various kinds of images to be scanned by a facsimile apparatus or the like, the inventor obtained the following results as shown in FIG. 15: If an image consisting of letters is used, even if the image consists of the smallest letters, the maximum value of the appearance frequencies R(1) through R(4) is not larger than approximately 60000 as long as the image is represented on an A-4 size paper sheet. Further, image information obtained as a result of performing either the error dispersion method or the dithering method on an A-4 size picture image (halftone image) results in that the appearance frequencies R(1) through R(4) includes one appearance frequency which is far larger than 60000.

Therefore, in the facsimile apparatus in the sixth embodiment, when such an A-4 size image is used, a value slightly larger than 60000 is used as the above-mentioned predetermined value Rmax. If the 4 appearance frequencies R(1) through R(4) include one appearance frequency which is larger than the Rmax (Yes in S402), the line density DTL is determined as the optimum line density for the image in S403. Thus, when an original image being scanned by the scanner 1 is a halftone image, the DTL is determined as the optimum line density therefor.

If every one of the four appearance frequencies R(1) through R(4) is not larger than the above-mentioned predetermined value Rmax (No in S402), it is determined whether or not every one of the five appearance frequencies R(1), R(2), R(3), R(4) and R(5L) is not larger than another predetermined value Rmin in S404.

As shown in FIG. 15, if an image being scanned by the scanner 1 is an image consisting of very large letters, corresponding to the folded line L5, every one of the five appearance frequencies R(1) through R(5L) measured thereon is very low. Within the five appearance frequencies, the appearance frequency R(5L) is slightly larger than the other 4 appearance frequencies. In the sixth embodiment, a value slightly smaller than the value of this appearance frequency R(5L) is determined as the value Rmin.

If every one of the five appearance frequencies R(1) through R(5L) is smaller than the Rmin (Yes in S404), the STD is determined as the optimum line density in S405. Because the Rmin is determined as mentioned above, the image having been read in by the scanner 1 is likely a blank paper sheet. Therefore, it is suitable to determined the STD as the optimum line density. Thus, a data amount of the image information to be processed is effectively reduced.

If the five appearance frequencies R(1) through R(5L) include one appearance frequency which is not less than the Rmin (No in S404), it is determined whether or not every one of the four appearance frequencies R(1) through R(4) is smaller than the appearance frequency R(5L) in S406.

As shown in FIG. 15, only in a case where an image consists of very large letters, the appearance frequency R(5L) is larger than every one of the other four appearance frequencies R(1) through R(4).

Therefore, in the sixth embodiment, if every one of the four appearance frequencies R(1) through R(4) is smaller than the appearance frequency R(5L) (Yes in S406), the STD is determined as the optimum line density in S405. Thus, if an image consisting of very large letters is scanned by the scanner 1, the STD is determined as the optimum line density. Thus, a data amount of the image information to be processed can be effectively reduced.

If the four appearance frequencies R(1) through R(4) include one appearance frequency which is not smaller than the appearance frequency R(5L) (No in S406), a total value of the two appearance frequencies R(1) and R(2) are compared with a total value of the two appearance frequencies R(3) and R(4) in S407.

If an image consisting of small letters corresponding to the folded line L3 shown in FIG. 15 is used, the total value of the two appearance frequencies R(1) and R(2) is larger than the total value of the two appearance frequencies R(3) and R(4) as shown in the figure. In contrast to this, if an image consisting of relatively large letters corresponding to the folded line L4 shown in FIG. 15 is used, the total value of the two appearance frequencies R(1) and R(2) are smaller than the total value of the two appearance frequencies R(3) and R(4).

Therefore, in the sixth embodiment, if the total value of the two appearance frequencies R(1) and R(2) is not less than the total value of the two appearance frequencies R(3) and R(4) (No in S407), the DTL is determined as the optimum line density in S403. If the total value of the two appearance frequencies R(1) and R(2) is smaller than the total value of the two appearance frequencies R(3) and R(4) (Yes in S407), the STD is determined as the optimum line density in S405. Thus, line densities suitable for a case where an image consisting of small letters is used and a case where large letters is used respectively are determined as the optimum line density.

After the optimum line density has been thus determined by the optimum line density determining unit 4, the line density converter 6 converts the image information of the DTL line density after the image information read out of the image memory 5, if necessary, in accordance with the optimum line density output by the optimum line density determining unit 4. That is, if the STD has been determined as the optimum line density, the image information of the line density DTL is converted into the image information of the line density STD. The coder/decoder 3 codes the image information output by the line density converter 6 and the communicating unit 7 transmits the thus-coded image information.

As mentioned above, in the above-described embodiments of the present invention, according to the optimum line density determined by the optimum line density determining unit 4, a line density along the sub-scan direction is switched between the line densities DTL and STD. While a line density along the sub-scan direction is switched as mentioned above, a pixel density along the main scan line is fixed. In the sixth embodiment, run lengths measured along the sub-scan direction are used for determining the optimum line density as mentioned above. Therefore, when small run lengths are present along the sub-scan direction, this state is directly measured by the run length counter 10, and then, in accordance with the result of the measurement, a line density along the sub-scan direction is changed if necessary. Thus, in the sixth embodiment, it is possible to determine the optimum line density suitable for an actual state of an original image directly.

Further, in the sixth embodiment, in the optimum line density determination, four appearance frequencies of run lengths of 1, 2, 3 and 4 pixels, and an appearance frequency of run lengths of numbers of pixels not less than 5 pixels are used. Therefore, only 5 counters are required to obtain the above five appearance frequencies, thus merely a simple hardware is required and merely a simple software is required for identifying the thus-obtained count values.

Further, in the sixth embodiment, if the four appearance frequencies of run lengths of 1, 2, 3, and 4 pixels include one appearance frequency larger than a predetermined value, it is determined that a relevant image includes a halftone image part. As a result, a high line density is determined as the optimum line density for the image. Thus, as a result of checking merely the four appearance frequencies, it is possible to precisely determine a presence of a halftone image part. As a result, an image quality of the halftone image part is prevented from being degraded after being transmitted.

If every one of the four appearance frequencies of run lengths of 1, 2, 3, and 4 pixels is smaller than a predetermined value, it is determined that an original image is an image of a blank paper sheet. As a result, the lowest line density is determined as the optimum line density. Thus, it is possible to effectively reduce a data amount of image information to be transmitted.

If every one of the four appearance frequencies of run lengths of 1, 2, 3, and 4 pixels is smaller than the appearance frequency of run lengths of numbers of pixels not less than 5 pixels, it is determined that an original image is an image consisting of very large letters. As a result, a low line density is determined as the optimum line density. Thus, as a result of merely checking the 5 appearance frequencies, it is possible to precisely determine that the image consists of very large letters. Therefore, it is possible to effectively reduce a data amount of image information to be transmitted.

If a total value of the appearance frequencies of run lengths of 1 and 2 pixels is larger than a total value of the appearance frequencies of run lengths of 3 and 4 pixels, it is determined that an original image consists of small letters. As a result, a high line density is determined as the optimum line density. If the total value of the appearance frequencies of run lengths of 1 and 2 pixels is smaller than the total value of the appearance frequencies of run lengths of 3 and 4 pixels, it is determined that an original image consists of relatively large letters. As a result, a low line density is determined as the optimum line density. Thereby, it is possible to precisely determine whether the image consists of large letters or small letters. As a result, by adapting to the contents of the image, either a data amount of the image information can be effectively reduced or an image quality can be prevented from being degraded.

A facsimile apparatus in a seventh embodiment of the present invention will now be described.

Figure 16:
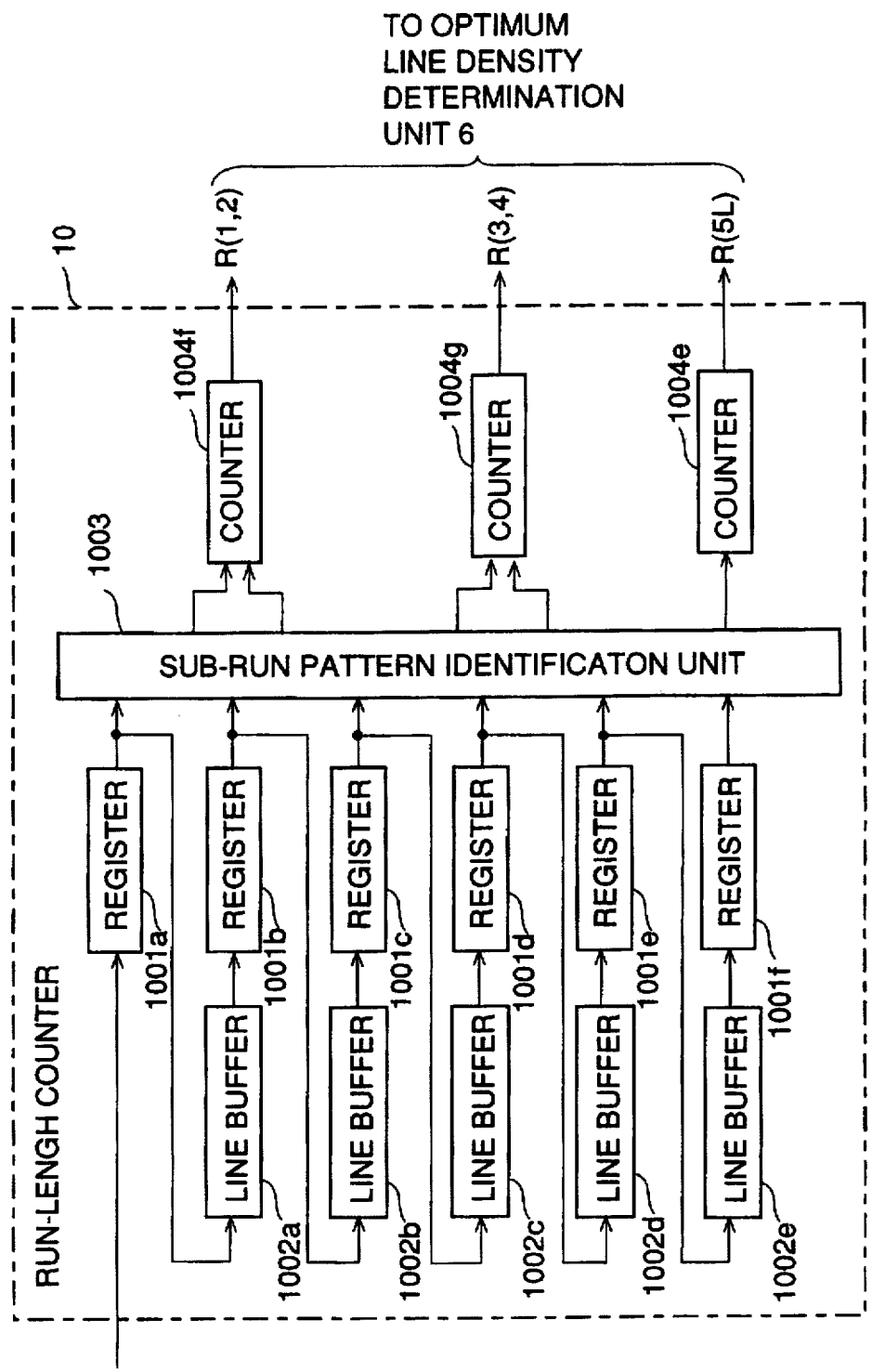
FIG. 16 shows a block diagram of a run-length counter used in a facsimile apparatus in a seventh embodiment of the present invention.

The facsimile apparatus in the seventh embodiment has a structure similar to the structure of the above-described apparatus in the sixth embodiment shown in FIG. 10. However, the run-length counter 10 used in the apparatus in the seventh embodiment has a structure shown in FIG. 16. In the run-length counter 10 used in the seventh embodiment, instead of the four counters 1004a through 1004d provided in the run-length counter 10 used in the sixth embodiment, two counters 1004f and 1004g are provided. Thus, a total of three counters 1004f, 1004g and 1004e are provided in the run-length counter 10 used in the apparatus in the seventh embodiment as shown in FIG. 16.

The counter 1004f counts an appearance frequency R(1, 2) which is an appearance frequency of a run length of 1 pixel and a run length of two pixels, that is, a total of an appearance frequency of a run length of one pixel and an appearance frequency of a run length of two pixels. Further, the counter 1004g counts an appearance frequency R(3, 4) which is an appearance frequency of a run length of 3 pixels and a run length of 4 pixels, that is, a total of an appearance frequency of a run length of 3 pixels and an appearance frequency of a run length of 4 pixels.

The facsimile apparatus in the seventh embodiment having the above-mentioned structure processes an image information in a procedure described above with referenced to FIG. 12.

Figure 17:
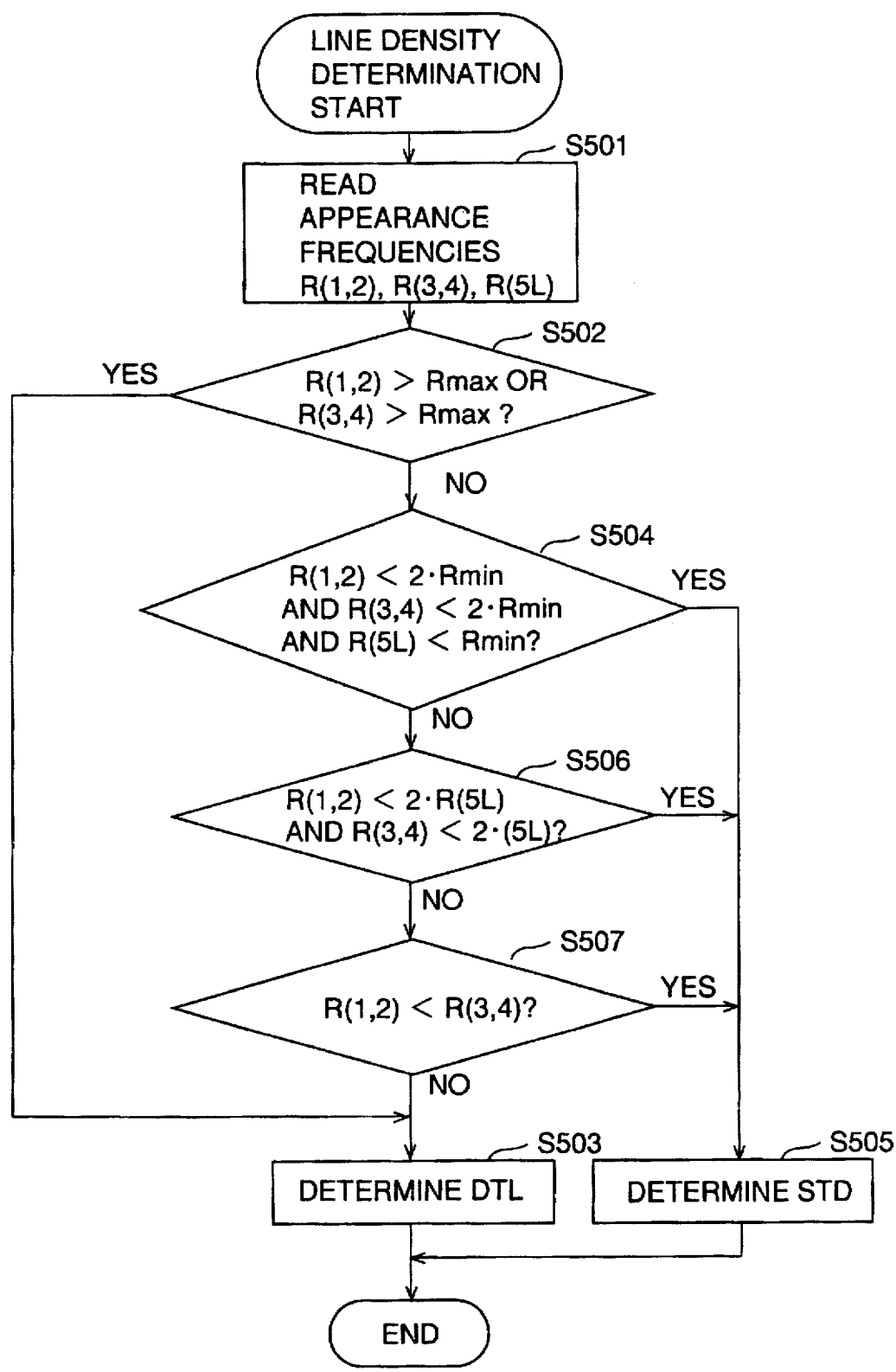
FIG. 17 shows an operation flowchart for determining an optimum line density in the facsimile apparatus shown in FIG. 16.

The run-length counter 10 thus counts the above-mentioned three appearance frequencies R(1, 2), R(3, 4) and R(5L). The optimum line density determining unit 4 determines the optimum line density in accordance with a procedure shown in FIG. 17. That is, after the run-length counter 10 has completed counting of the above-mentioned three appearance frequencies, the optimum line density determining unit 4 reads the thus-counted three appearance frequencies R(1, 2), R(3, 4) and R(5L) in S501. Then, in S502, the appearance frequency R(1, 2) and the appearance frequency R(3, 4) are used.

With reference to FIG. 15, it can be understood that the appearance frequencies R(1), R(2) and R(3) in the folded lines L1 and L2 measured on the halftone images are larger than the appearance frequencies R(1), R(2) and R(3) in the folded lines L3 L4 and L5 measured on the letter images.

Therefore, If either the appearance frequency R(1, 2) or R(3, 4) is larger than a predetermined value Rmax (Yes in S502), because it is likely that the currently processed image information is image information of a halftone image, the DTL is determined as the optimum line density used for the image information in S503.

If the appearance frequency R(1, 2) is not larger than the predetermined value Rmax and also the appearance frequency R(3, 4) is not larger than the predetermined value Rmax (No in S502), every one of the three appearance frequencies R(1, 2), R(3, 4) and R(5L) is used in S504. As described for the step S404 shown in FIG. 14, if the currently processed image information is an image information of an image of a blank paper sheet, every appearance frequencies is low.

Therefore, if every one of the appearance frequencies R(1, 2) and R(3, 4) is smaller than two times the Rmin, and also the appearance frequency R(5L) is smaller than the Rmin (Yes in S504), because it is likely that the image information is an image information of an image of a blank paper sheet, the STD is determined as the optimum line density used for the image information in S505.

Further, if either of the two appearance frequencies R(1, 2) and R(3, 4) include one appearance frequency which is not smaller than the two times the Rmin, or the appearance frequency R(5L) is not smaller than the Rmin (No in S504), the appearance frequencies R(1, 2) and R(3, 4) are compared with the appearance frequency R(5L), respectively, in S506.

As described above for the step S406 shown in FIG. 14, if the currently processed image information is image information of an image consisting of very large letters, as indicated by the folded line L5 shown in FIG. 15, every one of the appearance frequencies R(1), R(2), R(3), and R(4) is small but the appearance frequency R(5L) is slightly larger than every one of them.

Therefore, if every one of the appearance frequencies R(1, 2) and R(3, 4) is smaller than two times the appearance frequency R(5L) (Yes in S506), because it is likely that the image information is image information of an image consisting of very large letters, the STD is determined as the optimum line density in S505.

Further, if the two appearance frequencies R(1, 2) and R(3, 4) include one appearance frequency which is not smaller than the appearance frequency R(5L) (No in S506), the appearance frequency R(1, 2) is compared with the appearance frequency R(3, 4) in S507.

If the appearance frequency R(1, 2) is not smaller than the appearance frequency R(3, 4) in S507, the DTL is determined as the optimum line density in S504. If the appearance frequency R(1, 2) is smaller than the appearance frequency R(3, 4) in S507, the STD is determined as the optimum line density in S505. The reason of this determination is the same as the reason of the determination in the step S407 in FIG. 14. Thus, the optimum line density suitable for dimensions of letters constituting the relevant image can be determined.

Thus, in the above-described seventh embodiment, only three appearance frequencies are required for determining the optimum line densities. Therefore, only the three counters are required for the same purpose and thus it is possible to simplify hardware and software for the same purpose.

Further, by either using the three or two of the three appearance frequencies, it is determined whether the currently processed image information is image information of a halftone image, of an image of a blank paper sheet, of an image consisting of very large letters, of an image consisting of relatively large letters, or of an image consisting of relatively small letters. Thus, the optimum line densities suitable for various kinds of images can be easily and precisely determined.

A facsimile apparatus in an eighth embodiment of the present invention will now be described.

Figure 18:
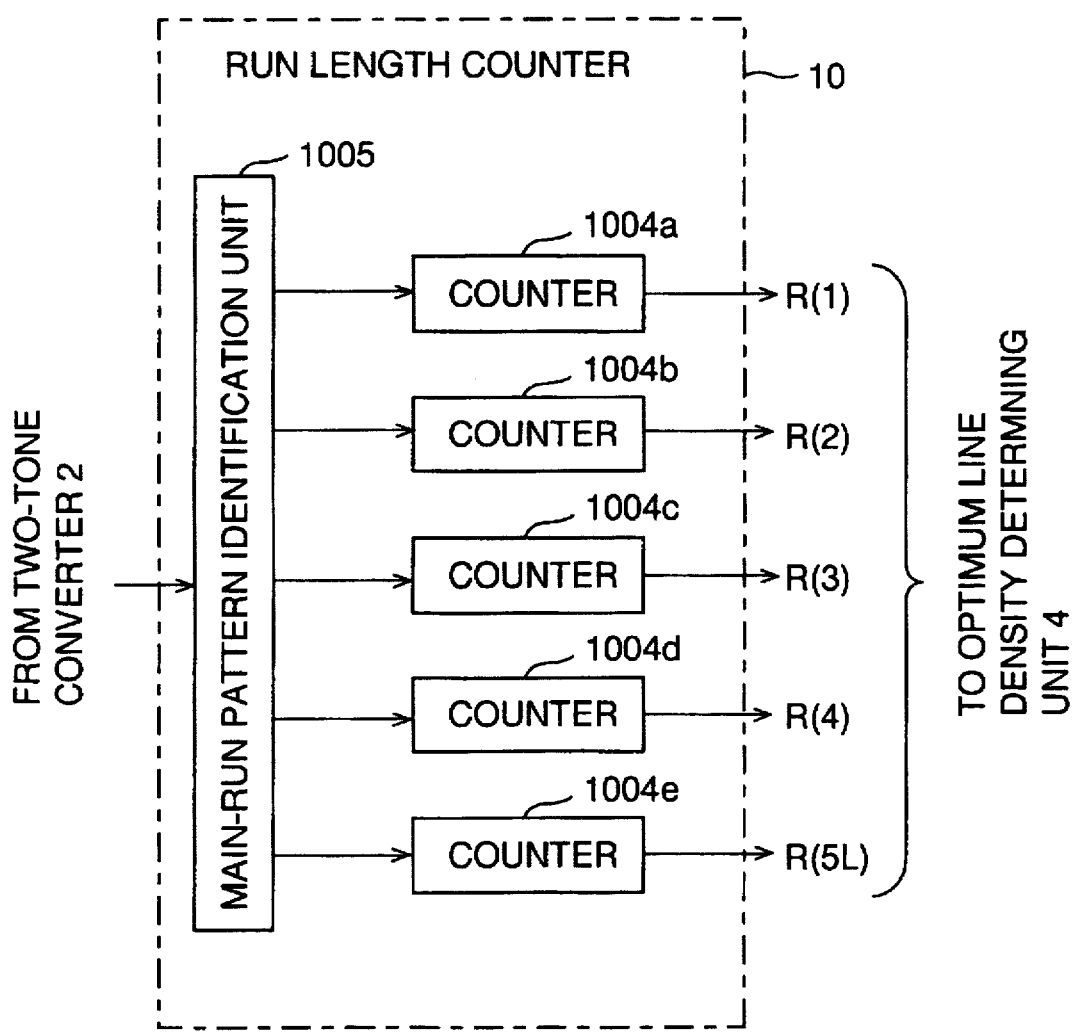
FIG. 18 shows a block diagram of a run-length counter used in a facsimile apparatus in an eighth embodiment of the present invention.

The facsimile apparatus in the eighth embodiment has a structure similar to the structure of the apparatus in the seventh embodiment as shown in FIG. 10. However, the run-length counter 10 used in the apparatus in the eighth embodiment has a structure shown in FIG. 18. That is, the run-length counter 10 used in the apparatus in the eighth embodiment includes a main-run pattern identifying unit 1005 instead of the sub-run pattern identifying unit 1003 shown in FIG. 11 and shown in 16. The main-run pattern identifying unit 1005 identifies run lengths along the main scan direction. The run-length counter 10 used in the apparatus in the eighth embodiment further includes the five counters 1004a, 1004b, 1004c, 1004d and 1004e for counting the run lengths identified by the main-run pattern identifying unit 1005.

The five counters 1004a, 1004b, 1004c, 1004d and 1004e count a run length of one pixel along the main scan direction, a run length of two pixels along the main scan direction, a run length of three pixels along the main scan direction, run length of four pixels along the main scan direction, and run lengths of numbers of pixels not less than five pixels along the main scan direction, respectively. As a result, the five counters 1004a, 1004b, 1004c, 1004d and 1004e count five appearance frequencies: the appearance frequency R(1) of a run length of one pixel, the appearance frequency R(2) of a run length of two pixels, the appearance frequency R(3) of a run length of three pixels, the appearance frequency R(4) of a run length of four pixels, and the appearance frequency R(5L) of run lengths of numbers of pixels not less than five pixels.

The facsimile apparatus in the eighth embodiment processes image information in the procedure described above with reference to FIG. 12. In this case, the optimum line density determining unit 4 determines the optimum line density based on the thus-obtained five appearance frequencies R(1) through R(4) and R(5L) in the procedure described above with reference to FIG. 14.

In the run-length counter 10 used in the apparatus in the eighth embodiment, in comparison with those shown in FIG. 11 and FIG. 16, the five line buffers 1002a through 1002e are not required because run lengths along the main scan direction are counted in the eighth embodiment while run lengths along the sub-scan direction are counted in the sixth and seventh embodiments. Thus, it is possible to simplify the circuit structure.

A facsimile apparatus in a ninth embodiment of the present invention will now be described.

Figure 19:
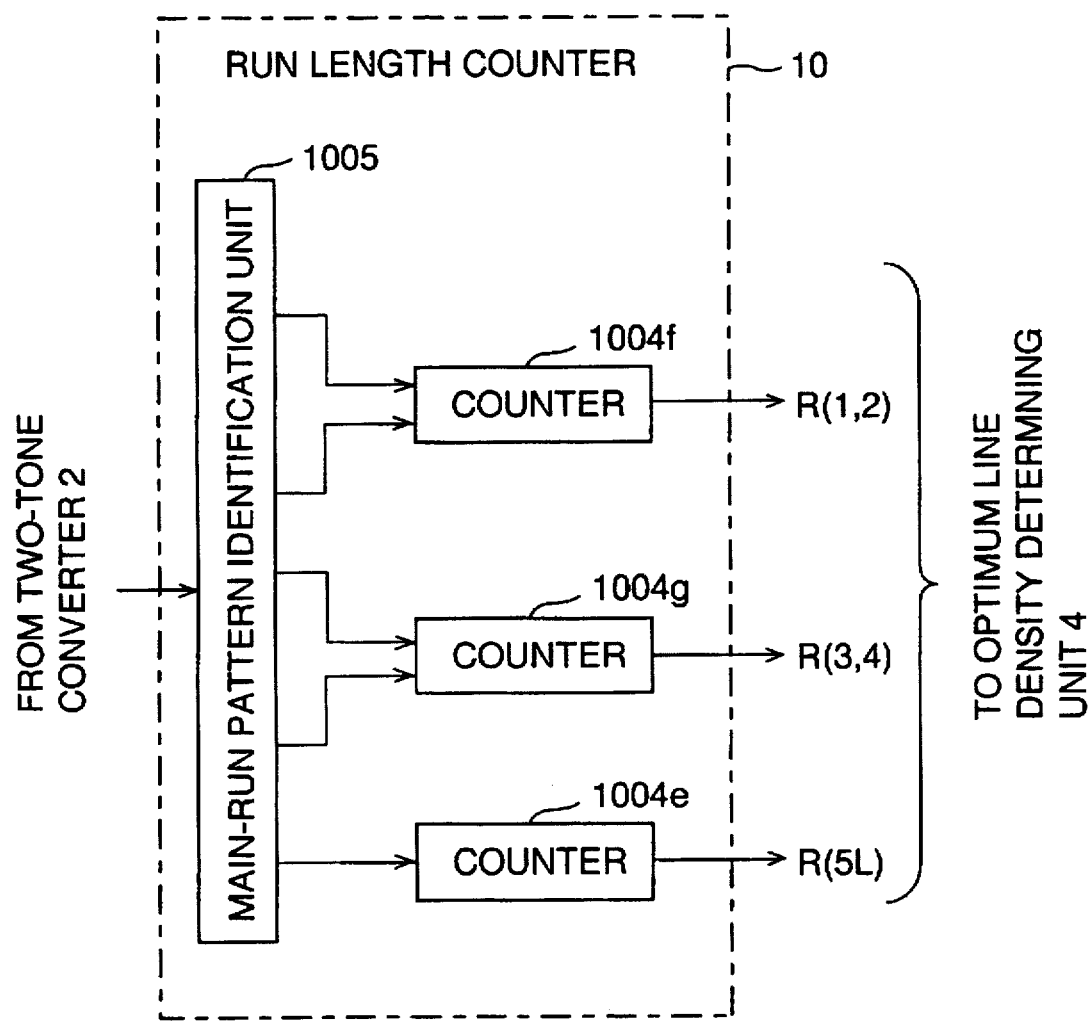
FIG. 19 shows a block diagram of a run-length counter used in a facsimile apparatus in an ninth embodiment of the present invention.

As shown in FIG. 19, in the run length counter 10 used in the facsimile apparatus in the ninth embodiment, the three counters 1004f, 1004g and 1004e count run patterns identified by the main-run pattern identifying unit 1005. Then, the optimum line density determining unit 4 determines the optimum line densities in the procedure shown in FIG. 17. As a result of comparing the structure shown in FIG. 19 with that shown in FIG. 18, it is possible to simplify the circuit structure of the run-length counter 10.

A facsimile apparatus in a tenth embodiment of the present invention will now be described.

The facsimile apparatus in the tenth embodiment has a structure shown in FIG. 10. However, the run-length counter 10 used in the apparatus in the tenth embodiment does not include any means for identifying various run lengths included in an image represented by currently processed image information. The run-length counter 10 used in the apparatus in the tenth embodiment includes the five counters 1004a, 1004b, 1004c, 1004d and 1004e as shown in FIG. 20A.

The facsimile apparatus in this structure transmits an original image, in a manner similar to each embodiment described above, in which, with reference to FIG. 20A, the scanner 1 scans the original image so as to output image information at the DTL line density, the two-tone converter 2 converts the thus-read image information into two tone image information thereof, and the thus-converted image information is temporarily stored in the image memory 5.

In the tenth embodiment, when the image memory 5 stores the image information, the coder/decoder 3 codes the same image information in the MH method. In this case, the coder/decoder 3 measures run lengths in each line (along the main scan direction) of the image information and thus detects various lengths of run lengths through run-length detecting means 3a. Then, code generating means 3b generates predetermined code information based on the result of the detection.

Figure 20A:
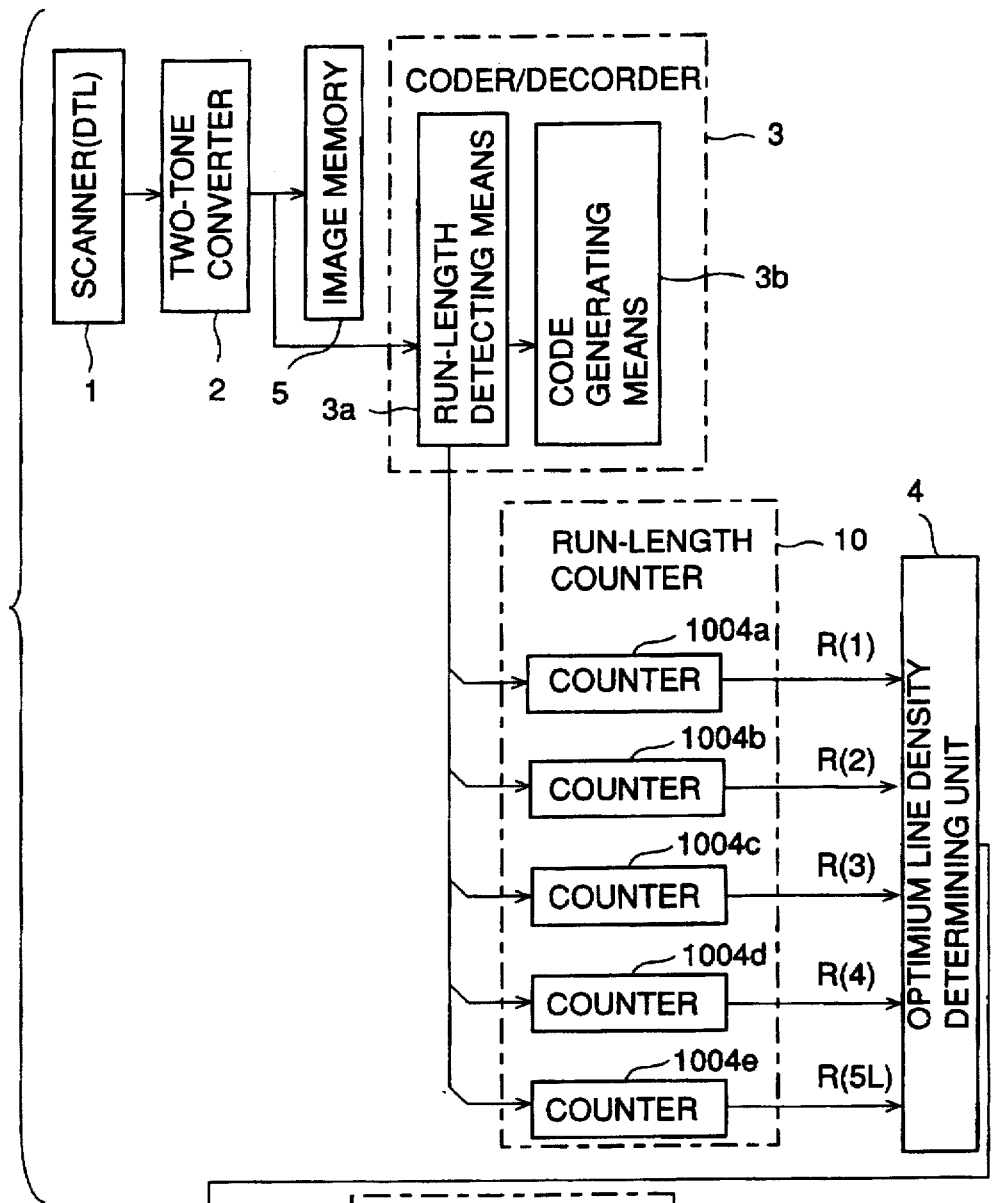
FIGS. 20A, and 20B show an operation of a facsimile apparatus in a tenth embodiment of the present invention by showing how information flows when image information is transmitted.

The result of detection output by the run-length detecting means 3a is input to the run-length counter 10 as shown in FIG. 20A. Based on the thus-input result of detection, the five counters 1004a through 1004e count the five appearance frequencies R(1), R(2), R(3), R(4), and R(5L), respectively. The optimum line density determining unit 4 determines the optimum line density based on the thus-counted five appearance frequencies.

Figure 20B:
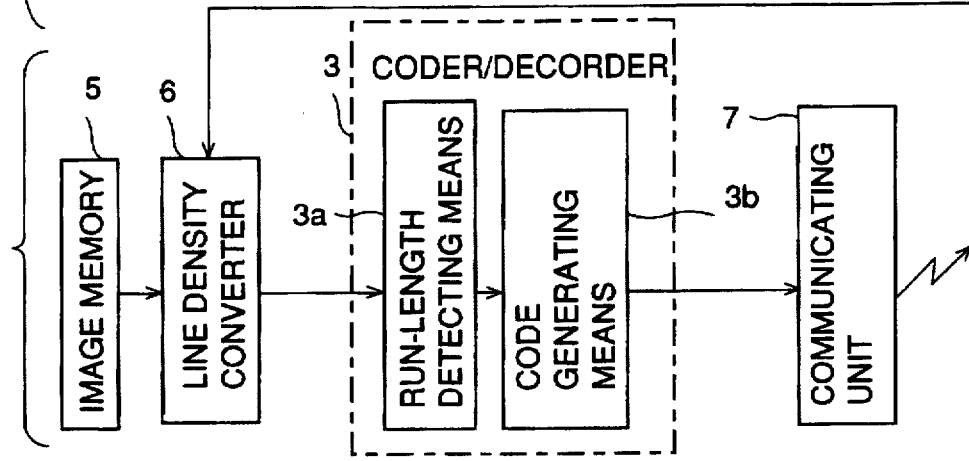

Then, the image information stored in the image memory 5 is transmitted. At this time, as shown in FIG. 20B, the image information stored in the image memory 5 is read out. Then, the line density converter 6 converts, if necessary, the thus-read out image information, and thus the image information at the optimum line density is obtained. The thus-obtained image information is coded by the coder/decoder 3 and then the thus-coded image information is transmitted through the communicating unit 7.

Thus, in the tenth embodiment, the result of detection output by the run-length detecting means 3a is used to count the various appearance frequencies. Therefore, it is not necessary to provided special run-length detecting means in the run-length counter 10 and thus it is possible to simplify the circuit structure of the run-length counter 10. Thus, it is possible to effectively simplify a hardware scale and/or a software scale required for counting the above-mentioned appearance frequencies.

A circuit in an eleventh embodiment of the present invention will now be described.

The circuit in the eleventh embodiment is a circuit for comparing the appearance frequencies of various lengths of run lengths with a predetermined value. Such a circuit may be used in each embodiment described above.

Figure 21:
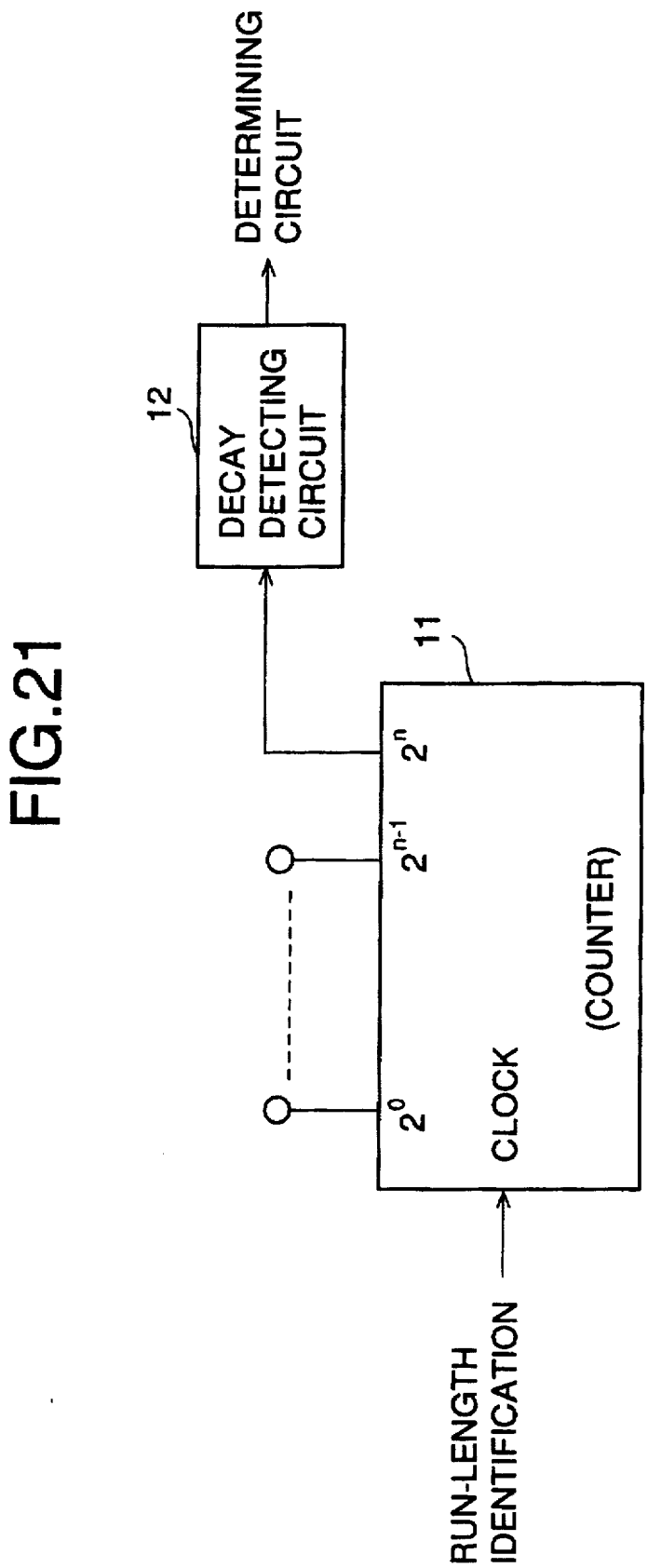
FIG. 21 shows a block diagram of a circuit in an eleventh embodiment of the present invention for detecting a matter that appearance frequencies of run lengths reach a predetermined value.

With reference to FIG. 21, a structure of the circuit in the eleventh embodiment will now be described. A counter 11 is a binary-number counter for counting, in binary, an appearance frequency of run lengths. A decay detecting circuit 12 detects a decay in a level of a signal in an n-th bit ($2^n$) of (n+1) count output bits ($2^0, 2^1, 2^2, 2^3, \ldots 2^n$) of the counter 11.

When an appearance frequency of run lengths, each having a specific length (a number of pixels constituting the run length), is counted in this circuit shown in FIG. 21, a run-length identifying circuit not shown in the figure identifies run lengths i which are run lengths, each having a length of i. The run-length identifying circuit outputs a clock pulse each time when it identifies a run length i, and the thus-output clock pulse is input to the counter 11. A count number in the counter 11 is increased by one at a time when the counter 11 receives each clock pulse. Thus, the count number in the counter 11 is increased at a time when each run length i appears and thus is identified by the run-length identifying circuit.

The signal in the n-th bit of the (n+1) count output bits rises in level when the count number in the counter 11 reaches $2^n$, and decays when the count number reaches $2^{n+1}$. The decay detecting circuit 12 detects this decay in level of the signal in the n-th bit of the count output bits. When the decay detecting circuit 12 detects the decay, it outputs a detection signal to a determining circuit not shown in the figure.

Thus, in the circuit shown in FIG. 21, the predetermined value of $2^{n+1}$ is used, and the above-mentioned detection signal is output when the appearance frequency of the run length i reaches a value not less than the thus-used predetermined value.

Thus, by using a value of $2^n$ (n being a natural number, that is, n=1, 2, 3, . . .) as a predetermined value, a matter that an appearance frequency reaches a value not less than the predetermined value can be easily detected merely as a result of monitoring a single bit of the counted appearance frequency expressed in a binary number. Thus, it is possible to effectively simplify a hardware scale and/or a software scale required for determining a matter that the above-mentioned appearance frequencies reach the predetermined value.

For example, if it is required to determine the predetermined value slightly larger than approximately 60000 as mentioned above, $2^n$ slightly larger than approximately 60000, that is, $2^{16}(=65,536)$ may be used as the predetermined value.

A page of image information is divided into 8 blocks and the various appearance frequencies are determined for the 8 blocks of the image information in each of the above-described second and fourth embodiments and also in a twelfth embodiment. In this case, a predetermined value to be used in determining the optimum line density such as that mentioned above may be approximately ⅛ the predetermined value used in the case where the various appearance frequencies are determined on an entire page of image information. That is, $2^{13}$ (=8,192) may be used as the predetermined value.

A facsimile apparatus in a twelfth embodiment of the present invention will now be described.

The facsimile apparatus in the twelfth embodiment determines the optimum line density through a different method.

Figure 22:
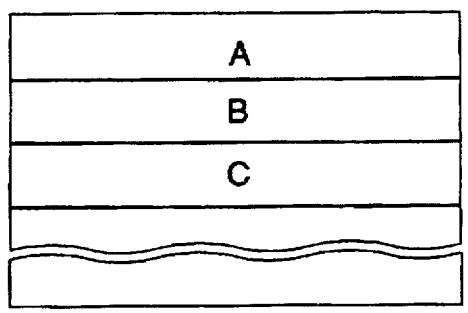
FIG. 22 illustrates dividing of a scanned image into a plurality of blocks in a facsimile apparatus in a twelfth embodiment of the present invention.
Figure 23:
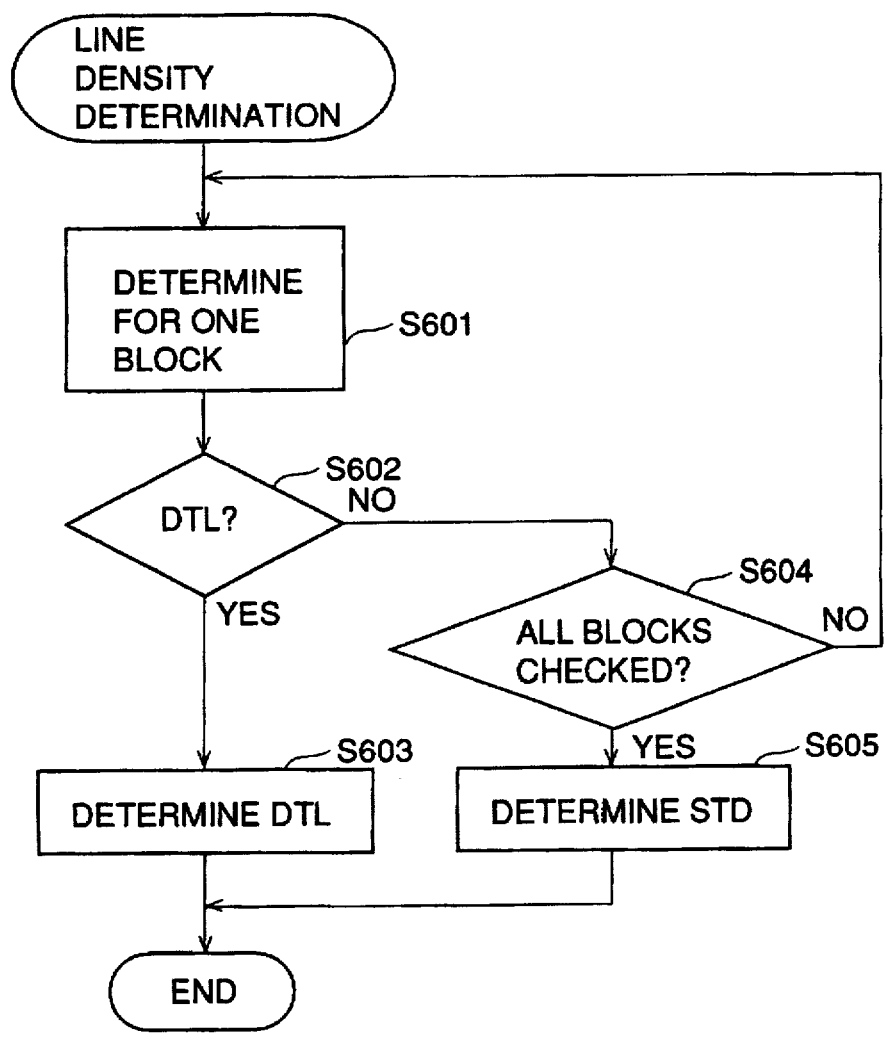
FIG. 23 shows an operation flowchart for determining an optimum line density in the facsimile apparatus shown in FIG. 22.

That is, in the apparatus in the twelfth embodiment, a page of image information is divided into a plurality of blocks A, B, C, . . . , as shown in FIG. 22. Then, as shown in FIG. 23, one block among the plurality of blocks is used and the various appearance frequencies of run lengths are counted on the thus-used block of image information. Based on the thus-counted appearance frequencies, either the DTL or the STD is determined as the optimum line density in S601.

If S601 determines the DTL as the optimum line density for the used block (Yes in S602), the DTL is determined as the optimum line density for the entire page of the image information in S603. However, if S601 determines the STD as the optimum line density for the used block (No in S602), S604 determines whether or not there is another block remaining which has not been used as a block on which the various appearance frequencies of run lengths are counted. If there is another block remaining (No in S604), this other block is used as the block on which the various appearance frequencies of run lengths are counted in S601.

Then, after a loop of S601, S602 and S602 is repeated, and if every block of the plurality of blocks has been used as the block on which the various appearance frequencies of run lengths are counted, and if the STD was determined as the optimum line density on every block (Yes in S604), it is determined in S605 that the STD is determined as the optimum line density for the entire page of the image information.

Thus, in the twelfth embodiment, a page of image information is divided into a plurality of blocks and the optimum line densities are determined for blocks of the plurality of blocks. Then, if the optimum line density determined for at least one block of the plurality of blocks is the DTL, the DTL is determined as the optimum line density for the entire page of the image information. In other cases, the STD is determined as the optimum line density for the entire page of the image information.

Therefore, if only a part of a page of image information includes small letter images, an image quality of the small letters is prevented from being degraded when it is transmitted.

Further, a common one of the optimum line density is determined for an entire page of image information although the entire page of image information is divided into a plurality of blocks and particular ones of the optimum line densities are determined for blocks of the plurality of blocks in each of the above-described second, fourth and twelfth embodiments. Then, the entire page of the image information in the above-determined common one of the optimum line density is transmitted. However, the present invention is not limited to this way. It is also possible to transmit the entire page of image information in a way in which each block of the plurality of blocks in a relevant one of the above-determined particular ones of the optimum line densities is transmitted. In this case, before transmitting the plurality of blocks to another facsimile apparatus, it is necessary to send the other facsimile apparatus information indicating sizes of the blocks and the above-determined particular ones of the optimum line densities. It is possible to sent such information indicating sizes of a blocks and particular ones of the optimum line densities in a known procedure signal provided for the facsimile communication separate from a signal carrying image information.

Further, in each of the above-described embodiments, the appearance frequencies of various lengths of run lengths are counted on one page of image information. Then, the thus-counted appearance frequencies are used in the determination of the optimum line density. However, the present invention is not limited to this way. An alternative way is also possible in which an appearance frequency ratio of the appearance frequencies of various lengths of run lengths to the appearance frequencies of all run lengths is obtained on a page of image information. Then, the thus-obtained appearance frequency ratio is used in the determination of the optimum line density.

In the third and fourth embodiments described above with reference to FIGS. 7 and 8, as described above, it may be necessary to change the value of the Rmax if a number of lines including the halftone region shown in the figures is relatively large or small in comparison with the number of all lines constituting the page of image information. However, if the above-mentioned alternative in which the appearance frequency ratio is used is applied to each one of the third and fourth embodiments described with reference to FIGS. 7 and 8, it is not necessary to change the value of the Rmax even if a number of lines include the halftone region shown in the figures is relatively large or small in comparison with the number of all lines constituting the page of image information.

Figure 24:
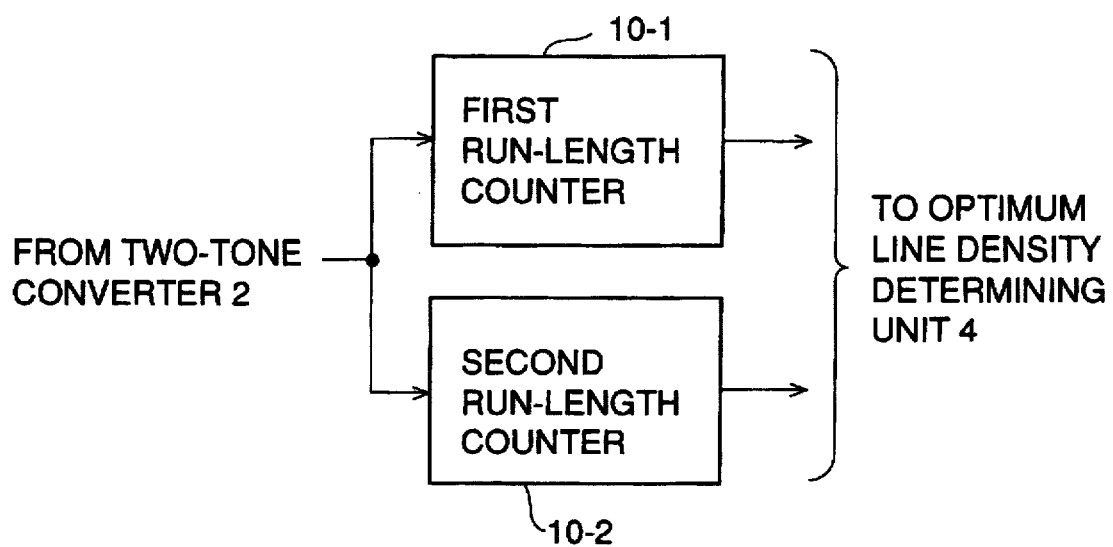
FIG. 24 shows a block diagram of a first run-length counter and second run-length counter used in a facsimile apparatus in a thirteenth embodiment of the present invention.

With reference to FIG. 24, a facsimile apparatus in a thirteenth embodiment of the present invention will now be described. The facsimile apparatus in the thirteenth embodiment has a structure similar to the structure of the above-described facsimile apparatus in the sixth embodiment of the present invention. However, a first run-length counter $10_{-1}$ and a second run-length counter $10_{-2}$ are provided instead of the run-length counter 10. The first run-length counter $10_{-1}$ counts run lengths along the main-scan direction while the second run-length counter $10_{-2}$ counts run lengths along the sub-scan direction. Thus, the two run-length counters $10_{-1}$ and $10_{-2}$ output the appearance frequencies of run lengths along the main-scan direction such as those output by the run-length counter 10 shown in FIG. 18 or FIG. 19, and the appearance frequencies of run lengths along the sub-scan direction such as those output by the run-length counter 10 shown in FIG. 11 or FIG. 16. The optimum line density determining unit 4 then determines a line density as the optimum line density based on the thus-output appearance frequencies of run lengths. A principle of the optimum line density determination is substantially the same as those described above for the previously described embodiments.

In the facsimile apparatus in the thirteenth embodiment, run lengths are counted for the main-scan direction and sub-scan direction. Therefore, it is possible to obtain more detailed information concerning a type of an original image. Thus, more suitable optimum line density determination can result therefrom.

Further, applications of the present invention are not limited to the facsimile apparatuses in the above-described embodiments. It is also possible to apply the present invention to other types of apparatuses which scan original images and then process them such as an image filing apparatus in which an original image is scanned and stored in a storage device. In the other types of apparatuses, original images are scanned and image information thereof is obtained at a certain line density. Then, the certain line density is converted into the optimum line density before further processing the image information. Thus, it is possible to effectively reduce hardware scales and/or software scales for performing the further processing when the optimum line density may be lower than the certain line density and it is possible to prevent an image quality from being degraded in the further processing when the optimum line density may be higher than the certain line density.

Further, the present invention is not limited to the above-described embodiments, and variations and modifications may be made without departing from the scope of the present invention.

What is claimed is:

1. An optimum line density determining method comprising steps of:
   a) counting a number of pixels included in each set of pixels which pixels are of a predetermined color and are continuously arranged along a predetermined same direction, said pixels being ones included in input image information;

said input image information consisting of lines of pixels, said lines being arranged in an original line density; and b) determining a high line density as an optimum line density if, as a result of the counting in said step a), it has been found that there are relatively many sets of predetermined-color pixels continuously arranged along the predetermined same direction, a number of pixels included in each set of said many sets of predetermined-color pixels continuously arranged along the predetermined same direction being small; determining a low line density as said optimum line density if, as a result of the counting in said step a), it has been found that there are relatively many sets of predetermined-color pixels continuously arranged along the predetermined same direction, a number of pixels included in each set of said many sets of predetermined-color pixels continuously arranged along the predetermined same direction being large; and determining said original line density as said optimum line density if a number of discrete pixels in a page of said input image information is not less than a predetermined value;

said optimum line density being a line density into which said original line density of said image information is then converted.

2. The optimum line density determining method according to claim 1, further comprising a step c) dividing a page of said input image information into a plurality of blocks; wherein:
   said step a) counts, for each block of said plurality of blocks, a number of pixels included in each set of pixels which pixels are of said predetermined color and are same-directionally continuously arranged along the same predetermined direction, said pixels being ones included in said input image information; and said step b) determines a high line density as an optimum line density if, as a result of the counting in said step a), said plurality of blocks includes at least one block which has relatively many sets of predetermined-color pixels continuously arranged along the predetermined same direction, each set consisting of a small number of pixels.

3. The optimum line density determining method according to claim 1, wherein said step a) performs the counting operation on an area of a page of said input image information, which area is an area other than an area including a halftone image.

4. The optimum line density determining method according to claim 1, wherein said step a) performs the counting operation using information obtained from a Modified Huffman method.

5. The optimum line density determining method according to claim 1, wherein said step a) performs the counting operation using information obtained from the known Modified Relative Element Address Designate method.

6. The optimum line density determining method according to claim 1, wherein said step b) determines a line density as the optimum line density based on:

a number of discrete pixels, a number of sets of pixels, each set of said sets consisting of 2 predetermined-color pixels continuously arranged along the predetermined same direction, a number of sets of pixels, each set of said sets consisting of 3 predetermined-color pixels continuously arranged along the predetermined same direction, a number of sets of pixels, each set of said sets consisting of 4 predetermined-color pixels continuously arranged along the predetermined same direction, and a number of sets of pixels, each set of said sets pixels consisting of a quantity of predetermined-color pixels continuously arranged along the predetermined same direction, which quantity is a number larger than 4.

7. The optimum line density determining method according to claim 1, wherein said step b) determines a high line density as the optimum line density if at least one number of four numbers is not less than a predetermined value, said four numbers being:

a number of discrete pixels, a number of sets of pixels, each set of said sets consisting of 2 predetermined-color pixels continuously arranged along the predetermined same direction, a number of sets of pixels, each set of said sets consisting of 3 predetermined-color pixels continuously arranged along the predetermined same direction, and a number of sets of pixels, each set of said sets consisting of 4 predetermined-color pixels continuously arranged along the predetermined same direction.

8. The optimum line density determining method according to claim 1, wherein said step b) determines a lowest line density as the optimum line density if every number of five numbers is smaller than a predetermined value, said five numbers being:

a number of discrete pixels, a number of sets of pixels, each set of said sets consisting of 2 predetermined-color pixels continuously arranged along the predetermined same direction, a number of sets of pixels, each set of said sets consisting of 3 predetermined-color pixels continuously arranged along the predetermined same direction, a number of sets of pixels, each set of said sets consisting of 4 predetermined-color pixels continuously arranged along the predetermined same direction, and a number of sets of pixels, each set of said sets of pixels consisting of a quantity of predetermined-color pixels continuously arranged along the predetermined same direction, which quantity is a number larger than 4.

9. The optimum line density determining method according to claim 1, wherein said step b) determines a low line density as the optimum line density if every number of four first numbers is smaller than a second number, said first four numbers being:

a number of discrete pixels, a number of sets of pixels, each set of said sets consisting of 2 predetermined-color pixels continuously arranged along the predetermined same direction, a number of sets of pixels, each set of said sets consisting of 3 predetermined-color pixels continuously arranged along the predetermined same direction, and a number of sets of pixels, each set of said sets consisting of 4 predetermined-color pixels continuously arranged along the predetermined same direction;

and said second number being a number of sets of pixels, each set of said sets of pixels consisting of a quantity of predetermined-color pixels continuously arranged along the predetermined same direction, which quantity is a number larger than 4.

10. The optimum line density determining method according to claim 1, wherein:

said step b) determines a high line density as the optimum line density if a total of a first number and a second number is larger than a total of a third number and a fourth number, and determines a low line density as the optimum line density if said total of said first number and said second number is smaller than said total of said third number and said fourth number;

said first number being a number of discrete pixels, said second number being a number of sets of pixels, each set of said sets consisting of 2 predetermined-color pixels continuously arranged along the predetermined same direction, said third number being a number of sets of pixels, each set of said sets consisting of 3 predetermined-color pixels continuously arranged along the predetermined same direction, and said fourth number being a number of sets of pixels, each set of said sets consisting of 4 predetermined-color pixels continuously arranged along the predetermined same direction.

11. The optimum line density determining method according to claim 1, wherein:

said step b) determines a line density as the optimum line density based on a total of a first number and a second number, a total of a third number and a fourth number, and a fifth number, said first number being a number of discrete pixels, said second number being a number of sets of pixels, each set of said sets consisting of 2 predetermined-color pixels continuously arranged along the predetermined same direction, said third number being a number of sets of pixels, each set of said sets consisting of 3 predetermined-color pixels continuously arranged along the predetermined same direction, said fourth number being a number of sets of pixels, each set of said sets consisting of 4 predetermined-color pixels continuously arranged along the predetermined same direction, and said fifth number being a number of sets of pixels, each set of said sets of pixels consisting of a quantity of predetermined-color pixels continuously arranged along the predetermined same direction, which quantity is a number larger than 4.

12. The optimum line density determining method according to claim 1, wherein:

said step b) determines a high line density as the optimum line density if either a total of a first number and a second number or a total of a third number and a fourth number is larger than a predetermined value, said first number being a number of discrete pixels, said second number being a number of sets of pixels, each set of said sets consisting of 2 predetermined-color pixels continuously arranged along the predetermined same direction, said third number being a number of sets of pixels, each set of said sets consisting of 3 predetermined-color pixels continuously arranged along the predetermined same direction, and said fourth number being a number of sets of pixels, each set of said sets consisting of 4 predetermined-color pixels continuously arranged along the predetermined same direction.

13. The optimum line density determining method according to claim 1, wherein:

said step b) determines a lowest line density as the optimum line density if every one of a total of a first number and a second number and a total of a third number and a fourth number is not larger than two times a predetermined value, and also if a fifth number is not larger than said predetermined value, said first number being a number of discrete pixels, said second number being a number of sets of pixels, each set of said sets consisting of 2 predetermined-color pixels continuously arranged along the predetermined same direction, said third number being a number of sets of pixels, each set of said sets consisting of 3 predetermined-color pixels continuously arranged along the predetermined same direction, said fourth number being a number of sets of pixels, each set of said sets consisting of 4 predetermined-color pixels continuously arranged along the predetermined same direction, and said fifth number being a number of sets of pixels, each set of said sets of pixels consisting of a quantity of predetermined-color pixels continuously arranged along the predetermined same direction, which quantity is a number larger than 4.

14. The optimum line density determining method according to claim 1, wherein:

said step b) determines a low line density as the optimum line density if every one of a total of a first number and a second number and a total of a third number and a fourth number is not larger than two times a fifth number, said first number being a number of discrete pixels, said second number being a number of sets of pixels, each set of said sets consisting of 2 predetermined-color pixels continuously arranged along the predetermined same direction, said third number being a number of sets of pixels, each set of said sets consisting of 3 predetermined-color pixels continuously arranged along the predetermined same direction, and said fourth number being a number of sets of pixels, each set of said sets consisting of 4 predetermined-color pixels continuously arranged along the predetermined same direction, and said fifth number being a number of sets of pixels, each set of said sets of pixels consisting of a quantity of predetermined-color pixels continuously arranged along the predetermined same direction, which quantity is a number larger than 4.

15. The optimum line density determining method according to claim 1 wherein a reference value is a value expressed by $2^n$, where said n is a natural number, said reference value being used in said step b) in a way in which said number of sets of predetermined-color pixels continuously arranged along the predetermined same direction, each set of said sets consisting of a predetermined number of pixels, is compared with said reference value.

* * * * *